US011329677B2

(12) United States Patent
Chakraborty et al.

(10) Patent No.: US 11,329,677 B2
(45) Date of Patent: *May 10, 2022

(54) HIGH DYNAMIC RANGE ASK WAKE-UP RECEIVER

(71) Applicant: Texas Instruments Incorporated, Dallas, TX (US)

(72) Inventors: Sudipto Chakraborty, Plano, TX (US); Jens Graul, Freising (DE); Ram Pratap Aditham, Den Bosch (NL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,033

(22) Filed: Jan. 6, 2020

(65) Prior Publication Data

US 2020/0153465 A1    May 14, 2020

Related U.S. Application Data

(63) Continuation of application No. 15/350,094, filed on Nov. 13, 2016, now Pat. No. 10,574,278.

(60) Provisional application No. 62/254,984, filed on Nov. 13, 2015.

(51) Int. Cl.
  *H04B 1/06* (2006.01)
  *H04L 27/06* (2006.01)
  *H04W 52/02* (2009.01)

(52) U.S. Cl.
  CPC .............. *H04B 1/06* (2013.01); *H04L 27/06* (2013.01); *H04W 52/0229* (2013.01); *H04W 52/0254* (2013.01); *Y02D 30/70* (2020.08)

(58) Field of Classification Search
  CPC ...... H04B 1/06; H04L 27/06; H04W 52/0254; H04W 52/0229
  USPC ......................................................... 375/320
  See application file for complete search history.

(56) References Cited

U.S. PATENT DOCUMENTS

| 7,031,409 | B2  |   | 4/2006  | Brobston et al. |              |
|-----------|-----|---|---------|-----------------|--------------|
| 7,119,620 | B2  | * | 10/2006 | Pan ............ | H03F 1/30    |
|           |     |   |         |                 | 330/289      |
| 7,921,351 | B2  |   | 4/2011  | Williams        |              |
| 9,356,615 | B1  | * | 5/2016  | Ranjbar ........ | H03M 1/68    |
| 2002/0030871 | A1 |  | 3/2002  | Anderson et al. |              |
| 2002/0127982 | A1 | * | 9/2002 | Haapoja ........ | H03D 3/009   |
|           |     |   |         |                 | 455/130      |
| 2003/0092412 | A1 |  | 5/2003  | Wu              |              |
| 2004/0062329 | A1 |  | 4/2004  | Hsu             |              |

(Continued)

OTHER PUBLICATIONS

International Search Report and Written Opinion dated Nov. 30, 2017, PCT Application No. PCT/US2017/048929, 6 pages.

*Primary Examiner* — Leila Malek
(74) *Attorney, Agent, or Firm* — Carl G. Peterson; Charles A. Brill; Frank D. Cimino

(57) ABSTRACT

A wireless wake-up receiver includes multiple signal chains each signal chain being coupled to continuously receive a signal from a respective antenna and to provide a respective detected pattern at a signal chain output. Each signal chain includes a first path having a mixer-first architecture and operates in a bandpass-mode using differential signals. The wireless wake-up receiver also includes a digital correlator operable to receive the respective detected patterns and to determine whether one of the respective detected patterns is equal to a desired pattern.

19 Claims, 14 Drawing Sheets

(56) References Cited

U.S. PATENT DOCUMENTS

| | | | |
|---|---|---|---|
| 2005/0058228 A1 | 3/2005 | Birkett | |
| 2006/0009180 A1* | 1/2006 | Xu | H04B 17/21 455/226.1 |
| 2007/0176682 A1 | 8/2007 | Nakamura et al. | |
| 2007/0184782 A1* | 8/2007 | Sahota | H04B 1/10 455/63.1 |
| 2008/0137777 A1 | 6/2008 | Behzad et al. | |
| 2008/0253277 A1* | 10/2008 | Lee | H04L 27/2647 370/203 |
| 2008/0290944 A1* | 11/2008 | Sarpeshkar | H03F 1/0266 330/261 |
| 2009/0225877 A1* | 9/2009 | Swarts | H04L 27/2647 375/260 |
| 2009/0286548 A1 | 11/2009 | Coronel et al. | |
| 2010/0029239 A1* | 2/2010 | Asuri | H03D 7/1458 455/333 |
| 2011/0043276 A1* | 2/2011 | Ito | H03D 1/06 329/304 |
| 2012/0320246 A1* | 12/2012 | Ikuma | H04N 5/3575 348/300 |
| 2013/0101013 A1 | 4/2013 | Kim et al. | |
| 2013/0222075 A1* | 8/2013 | Reedy | H03H 11/28 333/32 |
| 2014/0030996 A1* | 1/2014 | Gan | H03D 7/1458 455/326 |
| 2016/0072656 A1 | 3/2016 | Nilsson et al. | |
| 2016/0077502 A1 | 3/2016 | Broker | |
| 2017/0187405 A1 | 6/2017 | Sen et al. | |

* cited by examiner

HIGH DYNAMIC RANGE ASK WAKE-UP RECEIVER

CLAIM OF PRIORITY AND RELATED PATENT APPLICATIONS

This application is a continuation of U.S. patent application Ser. No. 15/350,094, filed Nov. 13, 2016, which claims priority to U.S. Provisional Patent Application No. 62/254,984, filed Nov. 13, 2015, entitled "HIGH DYNAMIC RANGE ASK RECEIVER WITH FAST RESPONSE," which Applications are hereby incorporated herein by reference in their entireties.

FIELD OF THE DISCLOSURE

Disclosed embodiments relate generally to the field of Amplitude Shift Keying (ASK) wake-up receivers. More particularly, and not by way of any limitation, the present disclosure is directed to a high dynamic range ASK wake-up receiver.

BACKGROUND

Amplitude shift keying is a form of amplitude modulation that represents digital data as variations in the amplitude of a carrier wave. The simplest and most common form of ASK operates as a switch, using the presence of a carrier wave having a fixed amplitude to indicate a binary one and the absence of the carrier wave to indicate a binary zero.

For battery-less communications, a wake up receiver is necessary to detect signal energy using certain modulation. In ASK, the signal detection generally happens using an automatic gain controller (AGC) to operate with the large dynamic range of the input signal. The input signal itself may be spectrally located in the middle of large blocker tones, and should still be detected and demodulated. To minimize energy consumption, the AGC loop needs to be very fast so that signal is detected within 2-3 system clock cycles.

Present state of the art wake up receivers typically employ costly off-chip components such as Surface Acoustic Wave (SAW) or Bulk Acoustic Wave (BAW) filters to either filter out unwanted signals and/or provide a stable clock for the receiver operation such that a power hungry phase locked loop is necessary. In addition, existing wake up receivers utilize significant duty cycling to reduce power, such that the ON current of such receivers is of little concern. For example, if a receiver consumes 10 milliwatts of power for peak performance and is duty cycled 0.01%, the average power consumption becomes 1 microwatt. While this is an attractive scheme for saving power, it does not fulfill the requirement of many systems where ubiquitous monitoring is necessary, e.g., for sensor applications.

SUMMARY

Disclosed embodiments implement a wake-up receiver using multiple (e.g., three) independent signal chains, each coupled to a respective antenna and providing an associated signal in X,Y,Z directions. Each of the signal chains is always ON and further contains two parallel paths, one a high sensitivity path and the second a low sensitivity path. The high sensitivity path is capable of receiving a lowest possible signal, while the low sensitivity path is capable of handling large signals and of providing significant rejection to unwanted blockers. All of the signal chains are clocked with a single low-power frequency locked loop (FLL) that provides non-overlapping clocks to the signal chains.

In one aspect, an embodiment of a wireless wake up receiver is disclosed. The wireless wake up receiver includes a plurality of signal chains, each signal chain of the plurality of signal chains being coupled to continuously receive a respective signal from a respective antenna and to provide a respective detected pattern at a respective signal chain output, each signal chain of the plurality of signal chains comprising a first path having a mixer-first architecture and operating in a bandpass-mode using differential signals; and a digital correlator operable to receive the respective detected patterns and to determine whether one of the respective detected patterns is equal to a desired pattern.

BRIEF DESCRIPTION OF THE DRAWINGS

Embodiments of the present disclosure are illustrated by way of example, and not by way of limitation, in the figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described. As used herein, the term "couple" or "couples" is intended to mean either an indirect or direct electrical connection unless qualified as in "communicably coupled" which may include wireless connections. Thus, if a first device couples to a second device, that connection may be through a direct electrical connection, or through an indirect electrical connection via other devices and connections.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing figures in which:

DETAILED DESCRIPTION OF THE DRAWINGS

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The disclosure will detail an always ON wake up receiver. Such always ON receivers are important in automotive applications, e.g., to detect an event of remote keyless entry into an automotive vehicle. Once the always ON receiver detects a valid signal, other circuitry can be powered up to perform additional functionality. An always ON receiver mandates that the receiver be low current and low power without sacrificing dynamic range in the signal. Accordingly, an always ON wake up receiver can be simpler in nature but requires careful optimization of both the system/circuit and of the IC floorplan placement in order to realize a feasible solution. In addition to performing wake up functionality, in many applications, the system is also utilized to detect the location of the object providing the transmitted pattern, e.g., by using principles of tri-angulation and multiple antennas. The disclosed wake-up receiver is targeted at, but not limited to, the application of near field communication (NFC), where the signal from the transmitter is magnetically coupled to the receiver.

Figure 1:
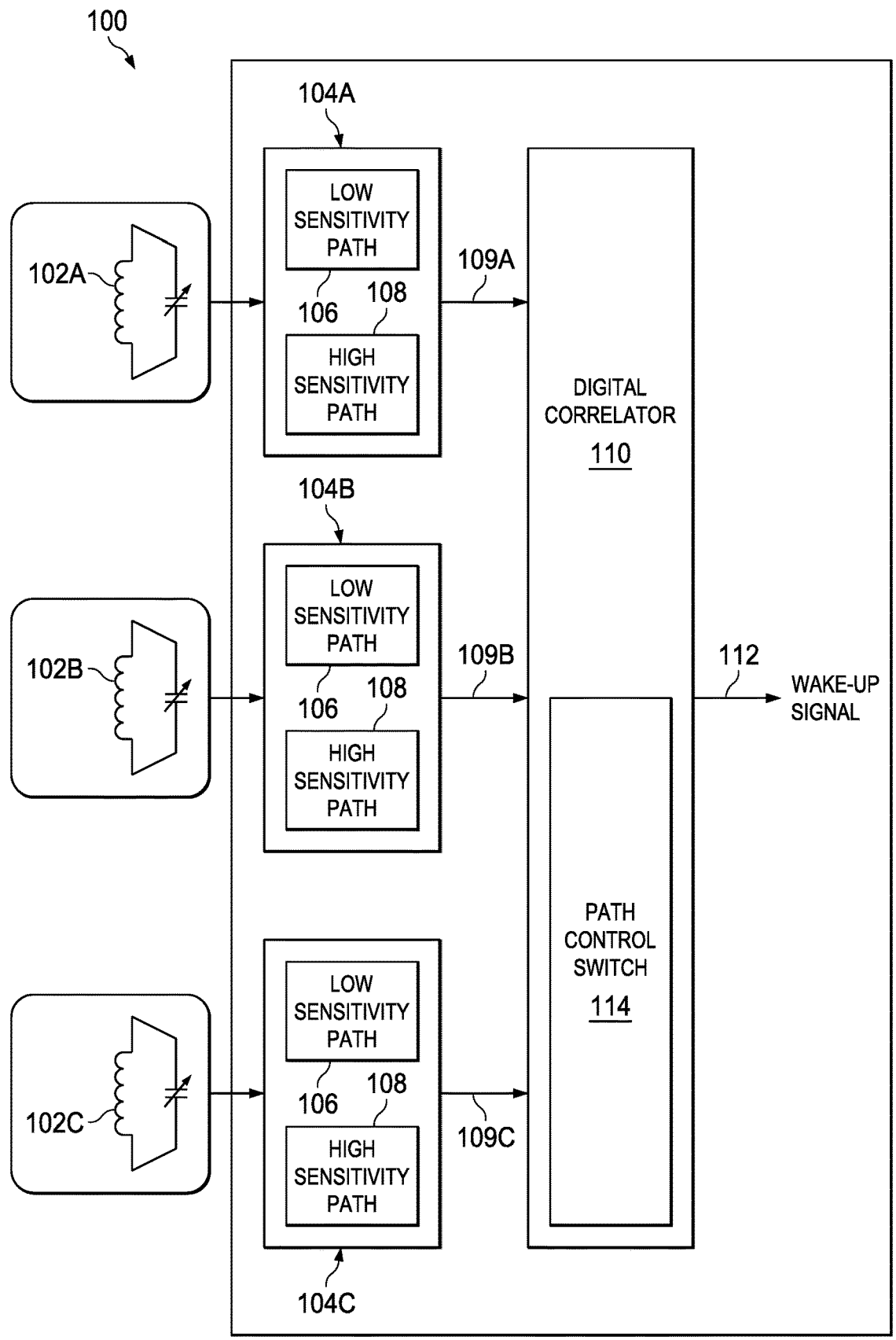
FIG. 1 depicts a high-level block diagram of a wake-up receiver having multiple antennae and multiple signal chains according to an embodiment of the disclosure.

FIG. 1 depicts a high-level block diagram of a wake-up receiver 100 having multiple, e.g., three, antennae 102A, 102B, 102C and multiple signal chains 104A, 104B, 104C. Each of the signal chains 104A, 104B, 104C is always ON and further contains two parallel paths—a respective low sensitivity path 106 and a respective high sensitivity path 108. High sensitivity path 108 can receive very weak signals in the presence of blockers and low sensitivity path 106 can handle large signals with moderate blocker rejection. Signal chains 104 are clocked with a single low power frequency locked loop (FLL) (not specifically shown) that provides non-overlapping clocks to the signal chains 104. A digital correlator 110 receives the outputs 109 of each of signal chains 104 and compares a received pattern to a desired pattern to determine whether a valid wake up event has occurred. When a valid wake up event has been detected on any of the signal chains 104, a wake-up signal 112 is sent. Path control switch 114 can be used to activate one of the two paths 106, 108 in each signal chain 104 and is discussed below.

Figure 2:
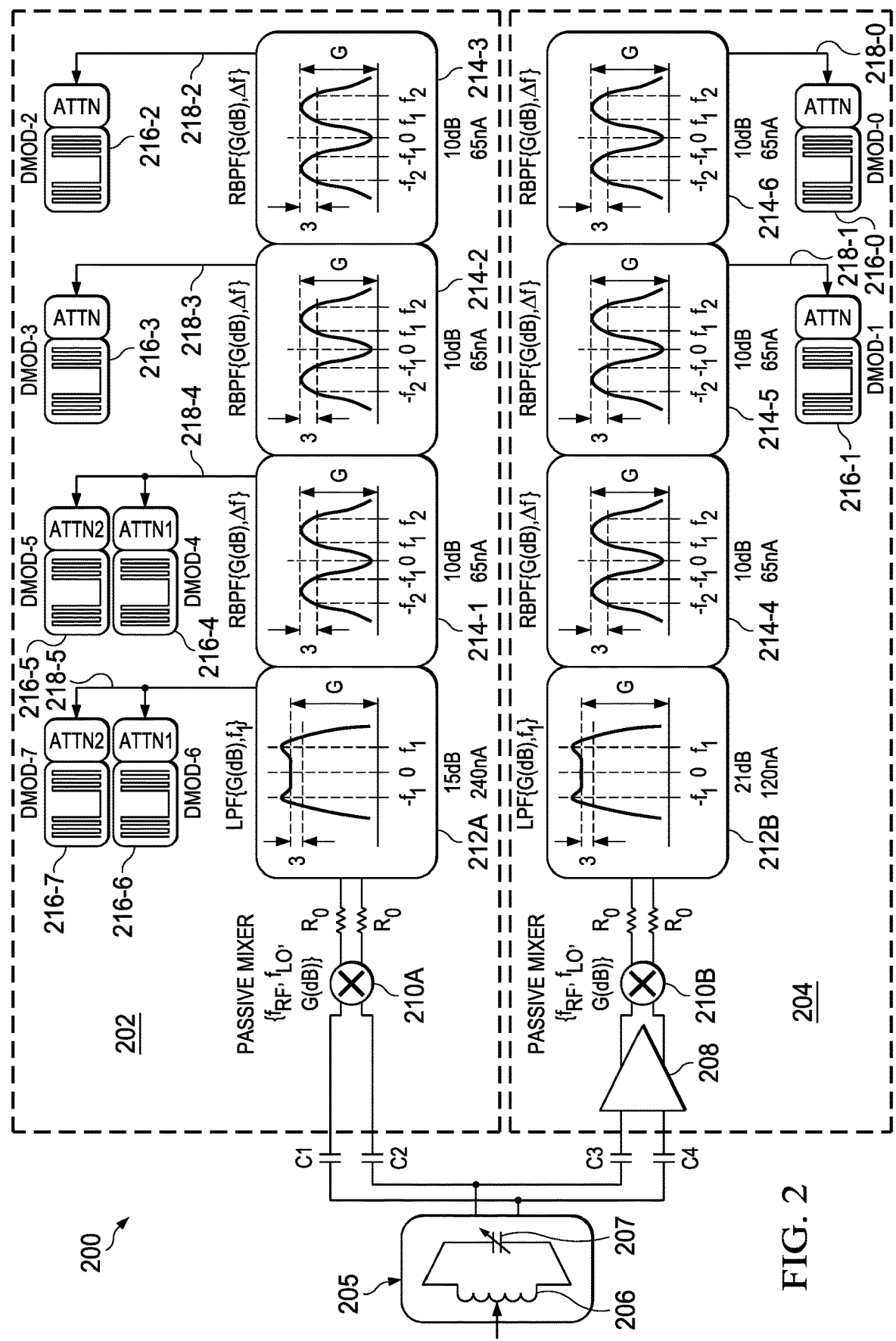
FIG. 2 depicts in greater detail one of the signal chains of FIG. 1 according to an embodiment of the disclosure.

FIG. 2 depicts a block diagram of a single wake up signal chain 200, such as one of signal chains 104. Signal chain 200 has an analog centric architecture. In the front of signal chain 200 is an inductor/capacitor (LC) tank 205 formed from the inductance of antenna 206 and an on- or off-chip capacitor 207 placed in parallel to antenna 206 in order to resonate at the frequency of the signal being received. This is followed by on-chip capacitors $C_1$, $C_2$, $C_3$, $C_4$ that capacitively couple the parallel resonance tank to the low sensitivity path 202 and high sensitivity path 204. Signal chain 200 contains four major components: (a) front end low noise amplifier (LNA) 208, which is provided only in the high sensitivity path 204, (b) passive mixers 210, which are built using complementary transistors, (c) fully differential analog filters 212, 214, and (d) demodulators 216. All couplings between LNA 208, mixers 210, analog filters 212, 214, and demodulators 216 are direct, i.e., there is no capacitive coupling between the separate components, although, as we will see below, at least one embodiment contains capacitive coupling that is part of the structure of the analog filters 214 and in general, at least one filter in each of low sensitivity path 202 and high sensitivity path 204 has capacitive coupling as part of the structure of the filter to provide blocking of any DC offsets. Providing the DC blocking internal to the filters means that no additional components or power are needed to remove any undesired DC offset. This is important, as compensating for DC offset can consume up to ten percent of the total current consumption by the filter in such a low-power system, as well as demanding large area on silicon. Additionally, low DC offset is generally realized by providing a filter having a larger area. By eliminating the DC offset, the receiver can be a low-area structure with the receiver utilizing smaller filters.

Capacitive coupling in the form of capacitors $C_1$, $C_2$, $C_3$, $C_4$ is used between the antenna 206 and each of the mixers 210A, 210B to avoid undesired coupling between the low sensitivity path 202 and the high sensitivity path 204. Mixers 210 receive the differential input signals from antenna 206 and also receive a frequency from a local oscillator (not specifically shown) and shift the incoming signal to a lower frequency. The local oscillator is a single ended oscillator and is followed by a non-overlapping clock generator (not specifically shown) to interface with the mixers 210 differentially. Each of analog filter 212, 214 provides both gain and filtering and is a real (i.e., not quadrature) bandpass filter; the gain of each filter 212, 214 is lower than the specific demodulators 216 to which the filter stage interfaces. Additionally, the linear signal processing range of an analog filter is greater than the linear signal processing range of a demodulator coupled to the analog filter.

As shown in signal chain 200, multiple demodulators 216 can be attached to a single filter stage, but receive different levels of attenuation of the associated output signal. For example, analog filter 212A supplies an output signal 218-5 to demodulator 216-6, which receives a first level of attenuation ATTN1, and also supplies the output signal 218-5 to demodulator 216-7, which receives a second level of attenuation ATTN2. Similarly, filter 214-1 supplies output signal 218-4 to demodulator 216-4, which receives the first level of attenuation ATTN1 and also supplies output signal 218-4 to demodulator 216-5, which receives the second level of attenuation. Filters 214-2, 214-3, 214-5, and 214-6 each provide a respective output signal 218-3, 218-2, 218-1, 218-0 to a single respective demodulator 216-3, 216-2, 216-1, 216-0.

The disclosed architecture does not utilize automatic gain control. Instead, the signal chain is operated at full power. Given the large dynamic range of the signal chain 200, only one or two of the demodulators 216 will be providing a valid signal at any one time; the remaining demodulators will be receiving a signal that is either too weak to provide a valid signal or contains too much noise for a valid signal. In general, the demodulators 216 have some overlap in dynamic range with adjacent demodulators in order to maximize the probability of wake pattern detection throughout the entire dynamic range. The numbering of the demodulators indicates the order in which the demodulators will be active; i.e., demodulator 216-0 is the most sensitive and will be active for the weakest signal. As demodulator 216-0 begins to receive a stronger signal, the magnitude of the noise in this demodulator starts to overwhelm the signal, but demodulator 216-1 will start producing a valid signal prior to loss of a valid signal on demodulator 216-0. As each demodulator is exhausted, a next demodulator in line becomes active with a valid signal. In one embodiment, the majority of the dynamic range is covered by the low-sensitivity path 202; the high-sensitivity path 204 covers a remaining portion of the dynamic range, with overlap between the two paths to ensure that an incoming signal will not fall into a hole in the coverage.

Signal chain 200 uses mixer-first architecture for the low sensitivity path 202, where the mixer 210A utilizes resistive degeneration provided by resistors $R_O$ coupled to the input of mixer 210A. The resistive degeneration for mixer 210A leads to linearization of the mixer 210A and, owing to signal loss through the mixer 210A, the ability of low sensitivity path 202 to handle large signals is greatly enhanced. Additionally, the resistive degeneration reduces loading on the antenna 206, which may be a resonant inductor/capacitor (LC) circuit for near field communications applications. The high sensitivity path 204 can include the same elements as the low sensitivity path 202, e.g., mixer 210B, analog filters 212, 214 and demodulators 216, but also includes a low noise amplifier 208. The voltage gain provided by LNA 208 reduces the input-referred noise in the remainder of the high sensitivity path 204.

In at least one embodiment, each of the signal chains 104 utilizes completely modular filters 212, 214. All of filters 212, 214 are differential and are of real-bandpass or real-lowpass type in order to reduce area. Filters 212A, 212B are each directly coupled to respective mixers 210A, 210B. As will be seen in greater detail below, in at least one embodiment, filters 212 each utilize two operational transconductance amplifiers (OTAs) and filters 214 utilize a single OTA based multi-feedback filter with bandpass response. The quality factor of the filters is carefully adjusted to balance the requirements of avoiding inter-symbol interference (ISI) with providing blocker rejection. A high quality factor for a filter indicates that the bandwidth for that filter is narrow; similarly, a low quality factor indicates the bandwidth is wide. Too high a quality factor in filters 212, 214 would lead to lower noise, greater sensitivity to component variations, large inter-symbol interference due to exponential decay of the amplitude of the signal, but superior blocker rejection. Similarly, too low a quality factor in filters 212, 214 would lead to higher noise due to a broader bandwidth in the filter, robustness against process variation, less ISI, but lower blocker rejection. In one embodiment, all of the filters 212, 214 have a quality factor between 1.25-1.5.

In one embodiment, all the multi-feedback filters 214 utilize a configuration where the input capacitors that are inherent to the filter operation blocks the DC offset resulting from the previous stages, so that a DC offset compensation DAC, which is typically placed at the input of a cascaded filter chain, is not necessary in-between the filter stages 212, 214. Using the inherent capacitors to block the DC offset saves significant power, area and implementation difficulties that are due to the inaccuracies of current mirrors at very low currents and the difficulty in calibrating a DC offset compensation DAC.

Figure 3:
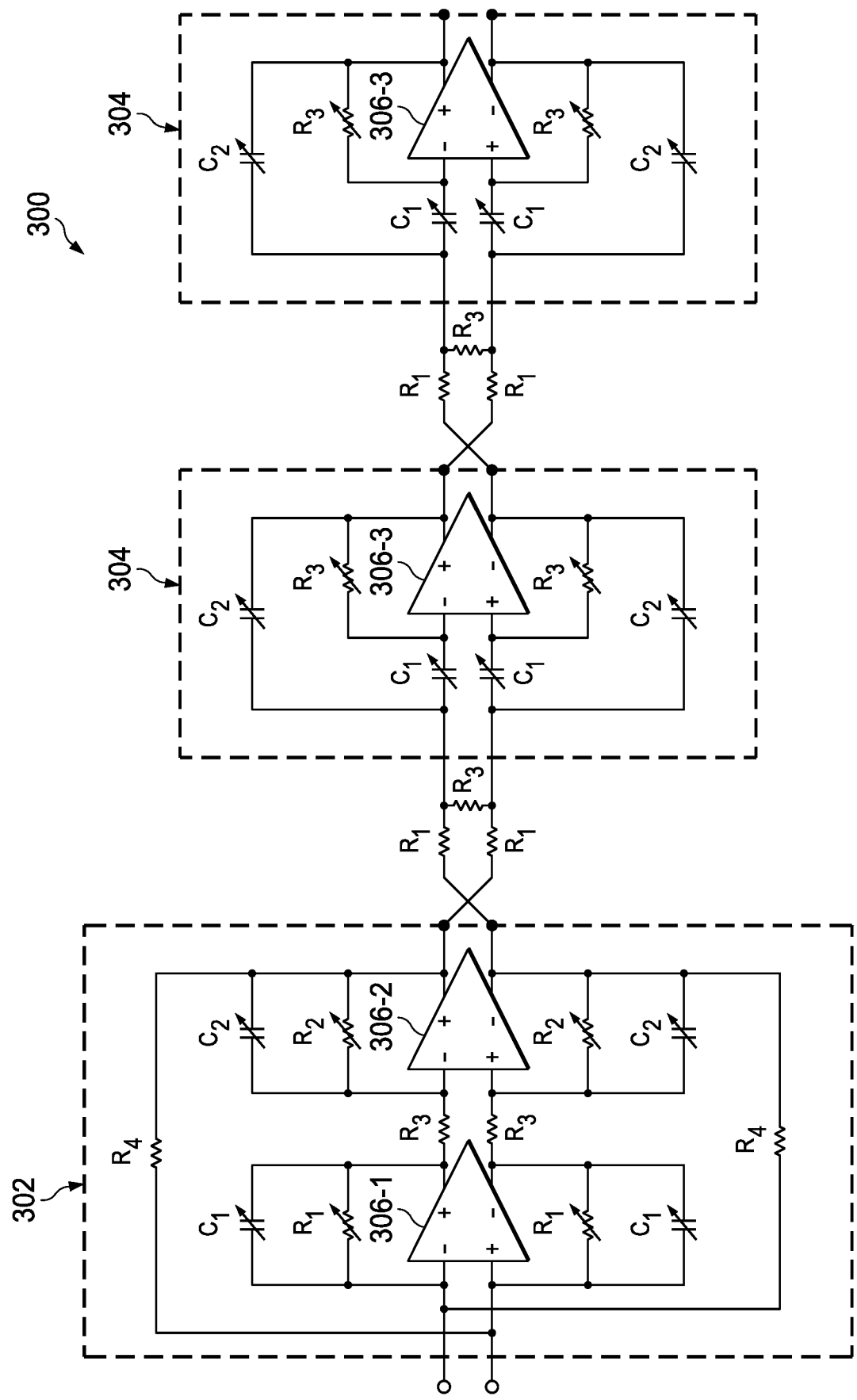
FIG. 3 depicts a circuit diagram of several example filters that can be used in the disclosed signal chains according to an embodiment of the disclosure.

All of the filters 212, 214 utilize circuit configurations that ensure that the negative real part of the input and output impedances of the filters are completely eliminated, such that each of the plurality of analog filters presents a positive real input impedance and provides a positive real output impedance. These configurations lead to stable operations (i.e., no oscillation) at ultra-low current consumptions. Moreover, the configuration of the filter 212 is built such as not to load the resonant LC tank properties, e.g., the resonant frequency and associated Q. FIG. 3 provides an example of one embodiment of filters 212, 214, but these embodiments are provided for illustration only and are not limiting. More important than a specific configuration for the filters is the properties that the filters possess. On one hand the properties of the filters 212, 214, such as the pole frequency and Q, can be configured to provide a desirable magnitude response that is maximally flat (i.e., a Butterworth type frequency response) in the passband for the wanted signal with strong attenuation to the blocker in the stop band but providing a time response that exhibits more undesirable ringing effects and inter symbol interference. On the other hand the pole frequency and Q can be configured for a maximally flat delay or linear phase response (i.e., a Bessel Thomson type frequency response) which while providing lesser attenuation to the blocker would exhibit a more desirable time domain response with less ringing and less inter-symbol interference.

In one embodiment shown in FIG. 2, the input signal received at antenna 206 is about 134 kHz, while the local oscillator LO (not specifically shown) operates at about 142 kHz and provides a gain of −4.3 dB. In the low-sensitivity path 202, analog filter 212A has a gain of 15 dB and consumes 240 nA of current, while each of analog filters 214-1, 214-2, 214-3 has a gain of 10 dB and a current consumption of 65 nA. The low-sensitivity path thus has an end-to-end gain $G_{E-E}$ of about 40 dB at an absolute difference frequency $f_{IF}$ of about 8 kHz. A second signal will also be provided at the sum frequency of 276 kHz, but this second signal will be severely attenuated by the filter. The low sensitivity path consumes a total of about 440 nA of current. An input signal having a peak signal of 500V at 40 dB gain will translate to a peak-to-peak differential of 50 mV at output peak detection. Low sensitivity path 202 covers input ranging from 1 mV to 4V peak-to-peak and has a 72 dB dynamic range.

Similarly, in high-sensitivity path 204, LNA 208 provides a gain of 15 dB and consumes 400 nA prior to providing the signal to mixer 210B, which again has a gain of −4.3 dB. Analog filter 212B provides a 21 dB gain and consumes 120 nA, while each of analog filters 214-4, 214-5, 214-6 provides 10 dB of gain and consumes 65 nA of current. The gain of the high-sensitivity path 204 at sensitivity, where the signal is the weakest, is about 63 dB, while high sensitivity path 204 consumes a total of about 720 nA. The high sensitivity path 204 covers an input range from about 50 μV to about 70 mV peak-to-peak for about 40 dB dynamic range. It can be seen that the low sensitivity path 202 covers the bulk of the dynamic range with lower current consumption than high-sensitivity path 204, which covers only the weakest signals. In addition to the current consumption of the analog filters, which totals about 1150 nA, the demodulators 216 each consume about 25 nA or a total of about 200 nA for all eight of the demodulators 216, bringing the total current consumption to about 1350 nA.

In the embodiment just described, the noise spectral density (which can be utilized to determine the signal-to-noise ratio of the system) of the low-sensitivity path is 1.53 $\mu V/\sqrt{Hz}$ at 8 kHz at the input of the system. With the addition of the LNA 208 to high-sensitivity path 204, the noise spectral density of the high-sensitivity path 204 rises to about 235 $nV/\sqrt{Hz}$ at 8 kHz. In order to provide additional current savings, in one embodiment, users can activate one path, such as the high-sensitivity path 204, only when necessary. In one example embodiment, low-sensitivity path 202 is always on, while high-sensitivity path 204, which consumes more power, is only turned on when no signal is found on low-sensitivity path 202. In this example embodiment, path control switch 114 is provided by digital correlator 110. The path control switch 114 can be provided to high-sensitivity path 204, which is enabled in response to the profile of an incoming signal.

FIG. 3 depicts a portion of a cascade of filters 300, such as can be utilized in low sensitivity path 202 and high sensitivity path 204. In this embodiment, the first filter 302 can be utilized as filters 212 in the disclosed signal chains, while filters 304 can be utilized as filters 214. Filter 302 contains two operational transconductance amplifiers (OTA) 306 connected in series; the resistance between the OTAs 306 is indicated by resistor $R_3$. Each of the OTAs 306 has a respective feedback network between the respective output nodes and the differential input nodes. Each of the feedback networks associated with OTA 306-1 include a capacitor $C_1$ and resistor $R_1$ coupled in parallel between the input and output nodes. Similarly, each of the feedback networks associated with OTA 306-2 include a capacitor $C_2$ and resistor $R_2$ coupled in parallel between the input and output nodes. Additionally, the positive output node of OTA 306-2 is coupled to the positive input node of OTA 306-1 and the negative output node of OTA 306-2 is coupled to the negative input node of OTA 306-1 with resistance $R_4$.

The transfer function for analog filter 302 is as follows:

$$\frac{V_o(s)}{V_i(s)} = \frac{\left(\frac{R_4}{R_5}\right)\left(\frac{R_1 R_2}{R_3 R_4}\right)\left(\frac{1}{R_1 R_2 C_1 C_2}\right)}{s^2 + s\left(\frac{1}{R_1 C_1} + \frac{1}{R_2 C_2}\right) + \left(\frac{1}{R_1 R_2 C_1 C_2} + \frac{1}{R_3 R_4 C_1 C_2}\right)} \quad \text{Equation 1}$$

where s is the Laplace operator. In one embodiment, the design of the filters is modularized and simplified by setting the R1=R2=R, setting C1=C2=C and setting R3=2R4=R/$\alpha$, where $\alpha$>1. In this special case the function above becomes:

$$s^2 + \frac{2s}{RC} + \left(\frac{1+2\alpha^2}{(RC)^2}\right) = \quad \text{Equation 2}$$

$$\left(\frac{R_4}{R_5}\right)\frac{2\left(\frac{\alpha}{RC}\right)^2}{\left(s + \frac{1+\sqrt{2}\,\alpha j}{RC}\right)\left(s + \frac{1-\sqrt{2}\,\alpha j}{RC}\right)}$$

which in terms of the center frequency becomes:

$$\frac{V_o(s)}{V_i(s)} = \left(\frac{R_4}{R_5}\right)\frac{2\left(\frac{\alpha}{RC}\right)^2}{s^2 + \frac{2\omega_c s}{\sqrt{2\omega^2 - 1}} + \frac{\omega_c^2(1+2\alpha^2)}{(2\alpha^2 - 1)}} \quad \text{Equation 3}$$

The max gain of analog filter 302 is given by $$A_{v,max} = \frac{\alpha}{\sqrt{2}}\left(\frac{R_4}{R_5}\right) \quad \text{Equation 4}$$

the DC gain is given by $$A_{v,0} = \left(\frac{2\alpha^2}{1+2\alpha^2}\right)\left(\frac{R_4}{R_5}\right) \quad \text{Equation 5}$$

the center frequency is given by $$f_c = \frac{\sqrt{2\alpha^2 - 1}}{2\pi RC} \quad \text{Equation 6}$$

and the quality factor is given by $$f_c = \frac{\sqrt{2\alpha^2 - 1}}{2\pi RC} \quad \text{Equation 7}$$

The remaining filters in the signal chain are represented by filter 304, which contains a single OTA 306-3. OTA 306-3 contains a feedback network associated with each of the differential signals that are received. The feedback network for OTA 306-3 includes a capacitor $C_2$ and a resistor $R_3$ coupled in parallel between the input and output nodes. Additionally, a capacitor $C_1$ is placed in series with the input of OTA 306-3 and inside the feedback loop containing capacitor $C_2$. Accordingly, it can be seen that any signal passing through filter 304 must pass through a capacitive coupling that is built into the structure of filter 304. In this manner, any DC common mode that is introduced by a previous stage is eliminated by the built-in capacitors $C_1$, $C_2$ of a following stage. In one embodiment, all of filters 214 are copies of filter 304 and have inherent capacitive coupling as part of the structure of filters 214; however only one of filters 214 is required to have capacitive coupling to remove DC coupling. In filters that require compensation for DC offset, the compensation can consume up to ten percent of the consumption of DC current, so eliminating the need for this compensation enables a lower consumption of current.

Filter 302, as well as other embodiments of filter 212, sets the common mode such that no DC current flows through the feedback network. Additionally, all the active stages operate in subthreshold, i.e., are biased in weak inversion. In the weak inversion region, the ratio of transconductance to current consumption for the amplifiers stages is maximized. Moreover as the transconductance is directly proportional to the quiescent current, the gain and frequency response of the amplifiers can simply be derived from an accurate measurement of current at DC, which simplifies the production testing cost. In the disclosed embodiments, the feedback networks associated with each of the OTAs consumes zero current. Additionally, the input common mode and the output common mode of each filter is held at one-half the difference between the upper rail and the lower rail. In one embodiment, the supply is 1.5 volts, so the common mode of the filters is 750 mV. This maximizes signal swing at the output of each filter structure. Each of filters 302, 304 realizes two poles. Filter 302 utilizes two OTAs to realize the two poles, but filter 304 uses only one OTA. This means that the noise of the architecture is largely limited by the noise of the first filter.

The transfer function for filter 304 is $$\frac{V_o(s)}{V_i(s)} = \frac{-Y_1 Y_3}{Y_5(Y_1 + Y_2 + Y_3 + Y_4) + Y_3 Y_4}.$$ Equation 8

In the special case in which $Y_1=1/R_1$, $Y_2=1/R_2$, $Y_3=s.C_3$, $Y_4=s.C_4$ and $Y_5=1/R_5$, then the transfer function becomes $$\frac{V_o(s)}{V_i(s)} = \frac{-1 \times s \left(\frac{1}{R_1 C_4}\right)}{s^2 + s\left(\left(\frac{C_3 + C_4}{C_3 C_4}\right) \times \frac{1}{R_5}\right) + \left(\left(\frac{1}{R_1} + \frac{1}{R_2}\right) \times \frac{1}{R_5} \times \frac{1}{C_3 C_4}\right)}$$ Equation 9

This equation can be equated to the general biquadratic transfer function of a band pass filter as follows:

$$\frac{V_o(s)}{V_i(s)} = \frac{H \times s \times \left(\frac{\omega_0}{Q}\right)}{s^2 + s\left(\frac{\omega_0}{Q}\right) + \omega_0^2}$$ Equation 10 and if $C_3=C_4=C$, then $$\omega_0 = \sqrt{\left(\frac{1}{R_1} + \frac{1}{R_2}\right) \times \frac{1}{R_5} \times \frac{1}{C^2}}$$ Equation 11

$$Q = \frac{1}{2} \times \sqrt{\left(\frac{1}{R_1} + \frac{1}{R_2}\right) \times R_5}$$ Equation 12

$$H = \frac{1}{2} \times \frac{R_5}{R_1}$$ Equation 13

If $R_2=\infty$, then $$\omega_0 = \sqrt{\frac{1}{R_1} + \frac{1}{R_1} \times \frac{1}{C^2}}$$ Equation 14

$$Q = \frac{1}{2} \times \sqrt{\frac{R_5}{R_1}}$$ Equation 15 and $$H = \frac{1}{2} \times \frac{R_5}{R_1}$$ Equation 16

By choosing the pole frequency $\omega_0$ and its associated Q, the properties of the filter can be configured towards either a desirable magnitude response or a desirable phase response. The properties of the filter as seen by the given equations are determined, not by the OTA 306 within the filter, but by the values of the resistors and capacitors placed within the filter.

Figure 4:
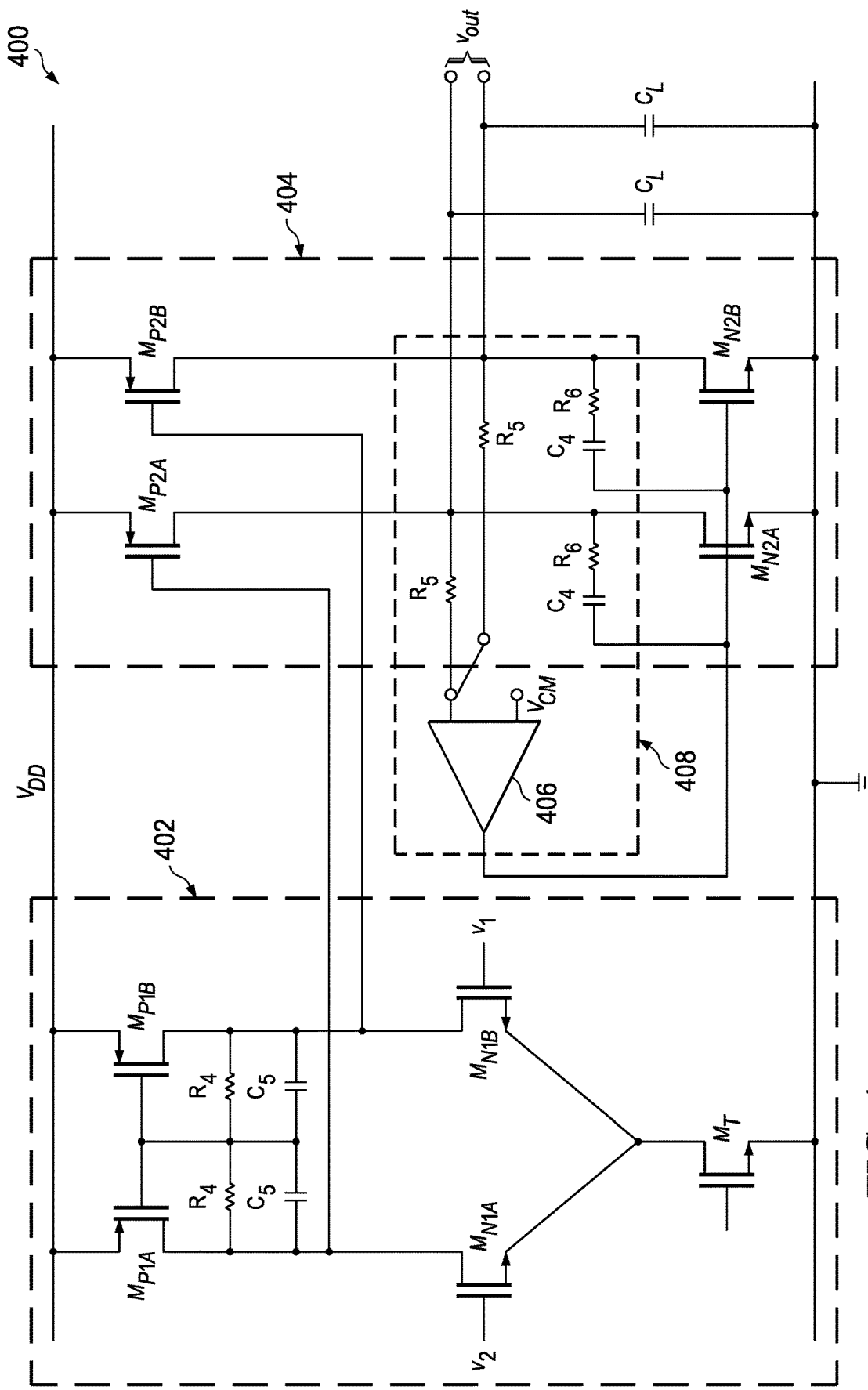
FIG. 4 depicts a circuit diagram of an example operational transconductance amplifier that can be utilized in the filters of the disclosed signal chains according to an embodiment of the disclosure.

FIG. 4 provides an example of an operational transconductance amplifier 400 that can be utilized as OTA 306 in the filters 212, 214, 302, 304. OTA 400 is a simple two stage amplifier, each stage comprising two pairs of complementary transistors. OTA 400 has a first stage 402 and a second stage 404, with each of stages 402, 404 comprising two pairs of complementary transistors. Stage 402 includes two p-type metal-oxide-semiconductor (PMOS) transistor $M_{P1A}$, $M_{P1B}$ and three n-type metal-oxide-semiconductor (NMOS) transistors $M_{N1A}$, $M_{N1B}$, $M_T$. Transistors $M_{P1A}$ and $M_{N1A}$ are coupled at respective drains and transistors $M_{P1B}$ and $M_{N1B}$ are also coupled at respective drains. The gates of transistors $M_{P1A}$, $M_{P1B}$ are coupled together and are also coupled to the drains of the respective transistors through resistances $R_4$. A capacitor $C_5$ is also connected across $R_4$ to aid compensation for both common mode and differential modes. The sources of transistors $M_{P1A}$, $M_{P1B}$ are each coupled to the upper rail, VDD and the sources of transistors $M_{N1A}$, $M_{N1B}$ are coupled together and also to the drain of transistor $M_T$, while the source of transistor $M_T$ is coupled to the lower rail. The differential input to the first stage 402 is provided to the gates of the two NMOS transistors $M_{N1A}$, $M_{N1B}$ and the differential output of the first stage 402 is taken from a point between the drains of $M_{P1A}$ and $M_{N1A}$ and from a point between the drains of $M_{P1B}$ and $M_{N1B}$ respectively.

The second or output stage 404 includes two PMOS transistors $M_{P2A}$ and $M_{P2B}$ and two NMOS transistors $M_{N2A}$ and $M_{N2B}$. Transistors $M_{P2A}$ and $M_{N2A}$ are coupled at respective drains and transistors $M_{P2B}$ and $M_{N2B}$ are also coupled at respective drains. The sources of transistors $M_{P2A}$, $M_{P2B}$ are each coupled, to the upper rail, VDD and the sources of transistors $M_{N2A}$, $M_{N2B}$ are coupled to the lower rail. The differential output from stage 402 is received at the gates of the two PMOS transistors $M_{P2A}$, $M_{P2B}$ and the differential output of stage 404 is taken from a point between the drains of $M_{P2A}$ and $M_{N2A}$ and from a point between the drains of $M_{P2B}$ and $M_{N2B}$ respectively.

Each of NMOS transistors $M_{N2A}$, $M_{N2B}$ has compensation elements, which in this instance include capacitor $C_4$ and resistor $R_6$ coupled in series between the gate and drain of the respective NMOS transistors $M_{N2A}$, $M_{N2B}$ to provide compensation for both the differential mode and common mode. Additionally, amplifier 406 has a first input terminal coupled through respective resistances $R_5$, to the points from which each of the differential outputs are taken; a second terminal of amplifier 406 receives a common mode voltage $V_{CM}$ and provides an output to the gates of NMOS transistors $M_{N2A}$, $M_{N2B}$. The feedback network 408, which includes amplifier 406, capacitors $C_4$ and resistors $R_6$, provides compensation for both differential and common mode at the output. Each of the outputs from OTA 400 also experiences a load capacitance $C_L$. All transistors in OTA 400 operate in the subthreshold region so that the transconductance $G_M$ divided by bias current $I_D$ is maximized. Accordingly, for a given input current, the maximum gain is obtained. The use of subthreshold operation goes well with the strategy of maintaining the DC values of the input and output at the midpoint of the two rails, as the operation in subthreshold is guaranteed by the DC biasing. This achieves self-balanced biasing of the OTA 400. OTA 400 does not utilize Miller compensation and the dominant pole is formed at the output. In a two-stage amplifier, such as OTA 400 where stage 402 is driving stage 404, if the poles of the two stages are very close to each other, this condition can create a stability problem. Accordingly, the amplifiers need to be compensated, both for common mode and for differential mode. The architecture of OTA 400 provides this compensation with a minimum of additional components that consume less real estate on the chip.

In order to realize continuous time analog filters using differential OTAs, the design of OTA 400 maximizes performance per given power consumption budget. OTA 306-1 in filter stage 302 consumes the maximum current, followed by multiple low power OTAs 306-2, 306-3. However, in addition to maximizing the gain bandwidth, the OTAs 306 need to be realized in low area as well. When operating in the subthreshold region, the transconductance is dependent only on current and not on device size. Accordingly, smaller area MOS devices are used at the input of OTAs 306. The DC offset resulting from the smaller transistors are not an issue due to the inherent choice of the filter cascades, i.e. at least one stage inherently uses a DC blocking capacitor $C_1$ as part of the filter. Low transistor size also leads to lower RC time constant at all the internal nodes and higher values of internal pole and zeros, thereby increasing the unity gain bandwidth of the OTAs per unit current. The dominant pole of the OTA is formed at the output, and the feedback network 408 is common between common mode and differential mode. These factors lead to savings in area and provide the flexibility that the zero can now be placed on top of the non-dominant pole, thereby improving the unity gain bandwidth further. Additionally, first stage 402 of the OTA 400 uses self-biased common mode feedback and the second stage uses the common mode feedback amplifier 406. This leads to fewer poles in the common mode path and to easy stabilization of two-stage OTA 400 at very low current. The common mode feedback network 408 uses only 1-3% of the overall current in the OTA and very little area. The output common mode of each OTA 400 is set to half the supply, maximizing signal swing at the output.

The equations relating to the OTA 400 can be described as follows. In the first stage, $$A_{v1} = \frac{-g_{m1} R_1}{(1 + sC_1 R_1)} \quad \text{Equation 17}$$

$$R_{\perp}1 = (R_{\perp}L1 \parallel r_{\perp}ds1) \quad \text{Equation 18}$$

and $$r_{ds1} = \frac{1}{(g_{dsN1} + g_{dsP1})} \quad \text{Equation 19}$$

In the second stage:

$$A_{v2} = \frac{g_{m2}}{\left(sC_L + \frac{1}{R_2}\right) + \frac{1}{\left(R_z + \frac{1}{sC_c}\right)}} = \quad \text{Equation 20}$$

$$\frac{-g_{m2} R_2 (1 + sC_c R_Z)}{1 + s[(C_L + C_C)R_2 + C_C R_z] + s^2 C_L C_C R_2 R_z}$$

$$R_{\perp}5 = (R_{\perp}L2 \parallel r_{\perp}ds2) \quad \text{Equation 21}$$

-continued $$r_{dsN2} = \frac{1}{(g_{dsN2} + g_{dsP2})} \quad \text{Equation 22}$$

Combining the equations for these two stages, the equation becomes:

$$A_v = A_{v1} A_{v2} = (g_{m1} R_1) \times (g_{m2} R_2) \times \quad \text{Equation 23}$$
$$\frac{1}{[1 + s\{(C_L + C_C)R_2 + C_C R_z\} + s^2 C_L C_C R_2 R_z]} \times$$
$$\frac{(1 + sC_z R_z)}{(1 + sC_1 R_1)}$$

Using dominant pole ($P_1$) assumption for the quadratic, the three poles and one zero of the OTA are shown by:

$$P_1 = -\frac{1}{2\pi[(C_L + C_C)R_2 + C_C R_z]} \quad \text{Equation 24}$$

$$P_2 = -\frac{(C_L + C_C)R_2 + C_C R_z}{2\pi C_L C_C R_2 R_z} \quad \text{Equation 25}$$

$$P_3 = \frac{1}{2\pi C_1 R_1} \quad \text{Equation 26}$$

$$z = -\frac{1}{2\pi C_C R_z} \quad \text{Equation 27}$$

The poles and zeros do not have any dependence on the transconductance gas of the MOS transistor, which is susceptible to variations in processes, bias conditions, etc. Independence from gas of the MOS transistor provides greater control of the locations of the poles and zeros.

Using the equations shown above with regard to the poles and zero, two cases can be analyzed, a first case when load capacitance $C_L$ is very large ($C_L \gg$ compensation capacitance $C_c$) and a second case when $C_L$ is very small ($C_L \ll C_c$). In the first case, $$P_1 \approx -\frac{1}{2\pi[(C_L + C_C)R_2]} \quad \text{Equation 28}$$

$$P_2 = -\frac{1}{2\pi C_C R_z} \quad \text{Equation 29}$$

$$P_3 = -\frac{1}{2\pi C_C R_1} \quad \text{Equation 30}$$

$$z = -\frac{1}{2\pi C_C R_z} \quad \text{Equation 31}$$

while in the second case, $$P_1 \approx -\frac{1}{2\pi C_C R_2} \quad \text{Equation 32}$$

$$P_2 \to \infty \quad \text{Equation 33}$$

$$P_3 = -\frac{1}{2\pi C_1 R_1} \quad \text{Equation 34}$$

-continued $$z = -\frac{1}{2\pi C_C R_z}$$ Equation 35

In the middle of the two ranges, an increase in $C_L$ leads to a reduction in both $P_1$ and $P_2$, while z remains constant, leading to a loss of phase margin in the OTA 400. In the first case, $P_2$ is on top of z, leading to a two-pole system, but $P_3$ should be much larger than $P_1$ to make $C_1$ as small as possible. Hence, too large a load capacitance is never a good idea for the targeted system, but making $P_3$ much larger than $P_1$ must always be a good choice.

Figure 5:
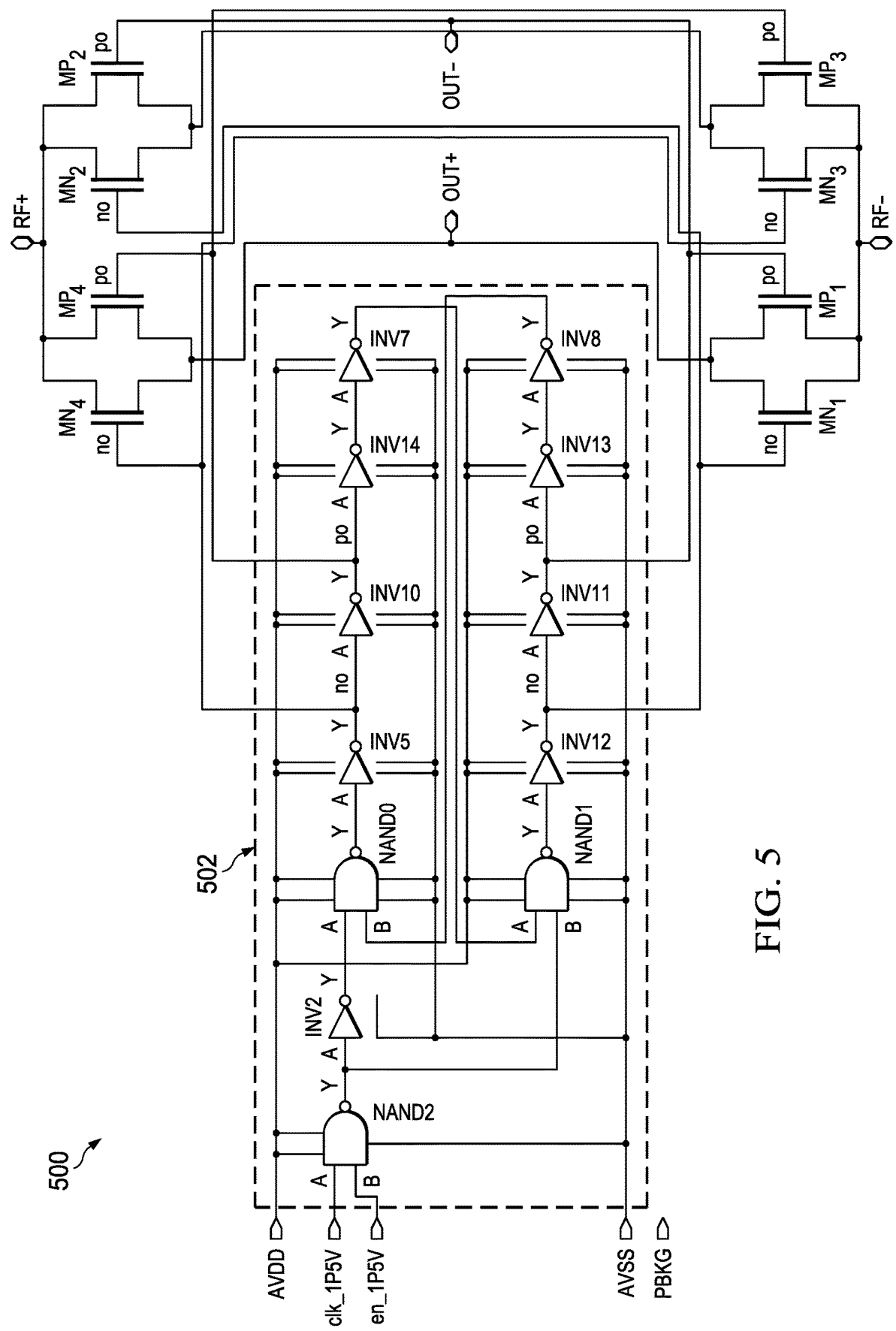
FIG. 5 depicts a circuit diagram of an example mixer that can be utilized in the disclosed signal chain according to an embodiment of the disclosure.

FIG. 5 depicts an example passive mixer 500 that can be utilized in the signal chains of the disclosed receiver. In mixer 500, four complementary transistors pairs are coupled in parallel between the upper rail and the lower rail. The drain of NMOS transistor $M_{N4}$ and the source of PMOS transistor $M_{P4}$ are each coupled to differential input signal $RF_+$ while the source of $M_{N4}$ and the drain of $M_{P4}$ are coupled together and are also coupled to output node $OUT_+$. The drain of NMOS transistor $M_{N1}$ and the source of PMOS transistor $M_{P1}$ are coupled together and are also coupled to output node $OUT_+$, while the source of $M_{N1}$ and the drain of Met are each coupled to differential input signal $RF_-$. Similarly, the drain of NMOS transistor $M_{N2}$ and the source of PMOS transistor $M_{P2}$ are each coupled to input signal $RF_+$ while the source of $M_{N2}$ and the drain of $M_{P2}$ are coupled together and are also coupled to output node $OUT_-$. The drain of NMOS transistor $M_{N3}$ and the source of PMOS transistor $M_{P3}$ are coupled together and are also coupled to output node $OUT_-$, while the source of $M_{N3}$ and the drain of $M_{P3}$ are each coupled to differential input signal $RF_-$. The gates of the four complementary transistor pairs are controlled by the logic gates 502, which switch transistors $M_{N1}$, $M_{N2}$, $M_{N3}$, $M_{N4}$, $M_{P1}$, $M_{P2}$, $M_{P3}$, $M_{P4}$ to provide the sum of the differential input signals and the differential signals from the local oscillator, which in one embodiment provides a frequency of 142 kHz. Passive mixer 500 provides complementary and rail-to rail operation so that a common mode voltage setting that is mid-way between the upper rail and the lower rail can be used to maximize the dynamic range per unit power consumption.

As mentioned previously, the disclosed architecture does not utilize any automatic gain control. Instead, the signal chain is operated at full power. Once each of the demodulators 216 runs out of an associated range, the demodulator is no longer able to distinguish between ones and zeros. As a signal is received at a given demodulator 216, e.g., demodulator 216-5, demodulator 216-5 may receive more noise than signal and will be unable to distinguish the signal. At some point in time, the noise can also become greater than the threshold of demodulator 216-5; in this instance, demodulator 216-5 will again be unable to distinguish the signal. Demodulator 216-5 will thus be able to provide valid distinctions between ones and zeros only during a period when the signal is greater than the threshold associated with demodulator 216-5 and the noise is less than the same threshold. The architecture is designed so that there is a certain amount of overlap in dynamic range between adjacent demodulators and also overlap in dynamic range between the low-sensitivity path 202 and the high-sensitivity path 204 to ensure that there is no point at which a signal will be out of the range covered by the wake-up receiver 100. At any one time, at least one demodulator 216 will be actively providing data; generally no more than two will be active at any one time.

Figure 6:
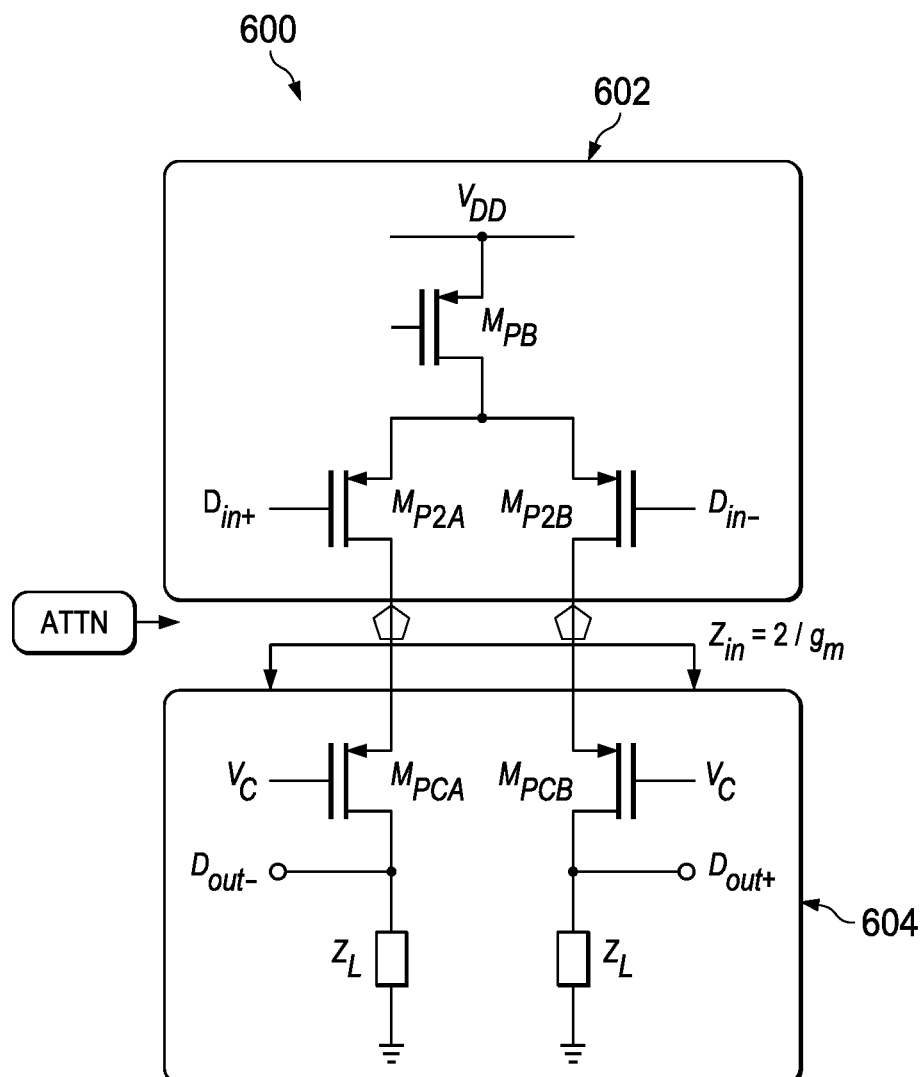
FIG. 6 depicts an example demodulator that can be utilized in the disclosed signal chains according to an embodiment of the disclosure.

FIG. 6 depicts an example demodulator 600 that can be utilized in the disclosed signal chains according to an embodiment of the disclosure. Demodulator 600 includes an input stage 602 and an output stage 604. Input stage 602 includes three PMOS transistors, $M_{PB}$, $M_{P2A}$, $M_{P2B}$ and output stage 604 includes two PMOS transistors $M_{PCA}$, $M_{PCB}$. Transistor $M_{PB}$ has a source coupled to the upper rail and a drain coupled to the source of both transistors $M_{P2A}$ and $M_{P2B}$. Transistors $M_{P2A}$ and $M_{P2B}$ are input transistors that receive the differential output signals from a filter at respective gates with a pre-determined amount of attenuation and operate in the subthreshold region. Transistor $M_{PB}$ is the biasing transistor. The drains of transistors $M_{P2A}$ and $M_{P2B}$ are coupled respectively to the sources of transistors $M_{PCA}$, $M_{PCB}$, while the drains of transistors $M_{PCA}$, $M_{PCB}$ are each coupled to the lower rail through impedance $Z_L$. The differential output of the demodulator 600 is taken between impedance $Z_L$ and respective transistors $M_{PCA}$, $M_{PCB}$.

A critical part of the system design is in the interfaces. Each interface between components in the signal chain uses a DC common mode level that is exactly half way between the upper and lower supply rails, and all the stages are directly coupled. Because of this design feature, there is no need for a common mode level shifter or for signal level adjustments; consequently, significant area and power is saved with no loss in the dynamic ranges of the blocks. The interfaces between analog filters 212, 214 and respective demodulators 216 are also DC coupled. In order to provide different levels of attenuation to multiple demodulators 216 associated with a single filter 212, 214, different levels of signal attenuation are obtained simply by tapping the common mode feedback variable resistor $R_5$ associated with each of the differential signals at the output of a respective OTA 400. For example, a first level of attenuation can be obtained by taking the differential signals from the differential outputs of the respective OTA, while a second level of attenuation can be obtained by taking the differential signals from a point near the midpoint of each of variable resistors R5. Because no additional resistors are necessary for signal attenuation, the space necessary to implement the wake-up receiver 100 remains low.

Figure 6A:
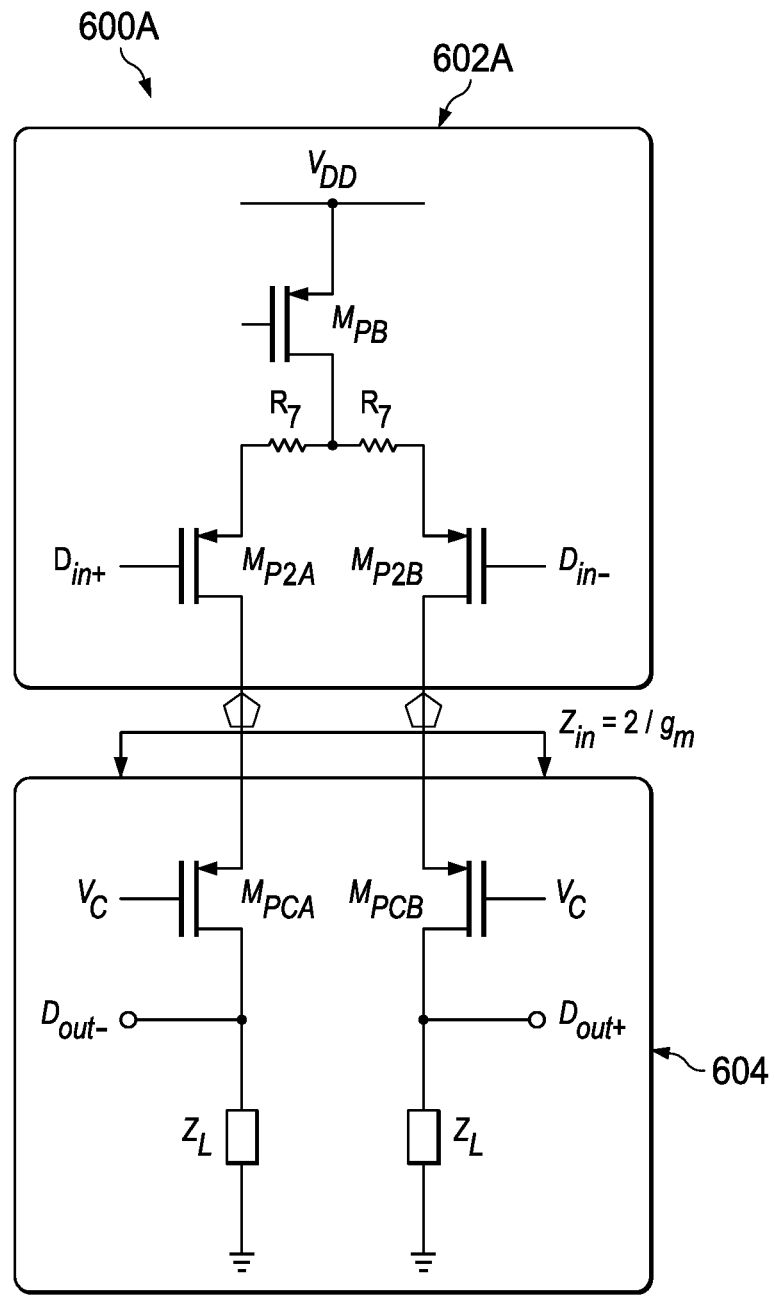
FIG. 6A depicts an example demodulator that can be utilized in the disclosed signal chains according to an embodiment of the disclosure.
Figure 6B:
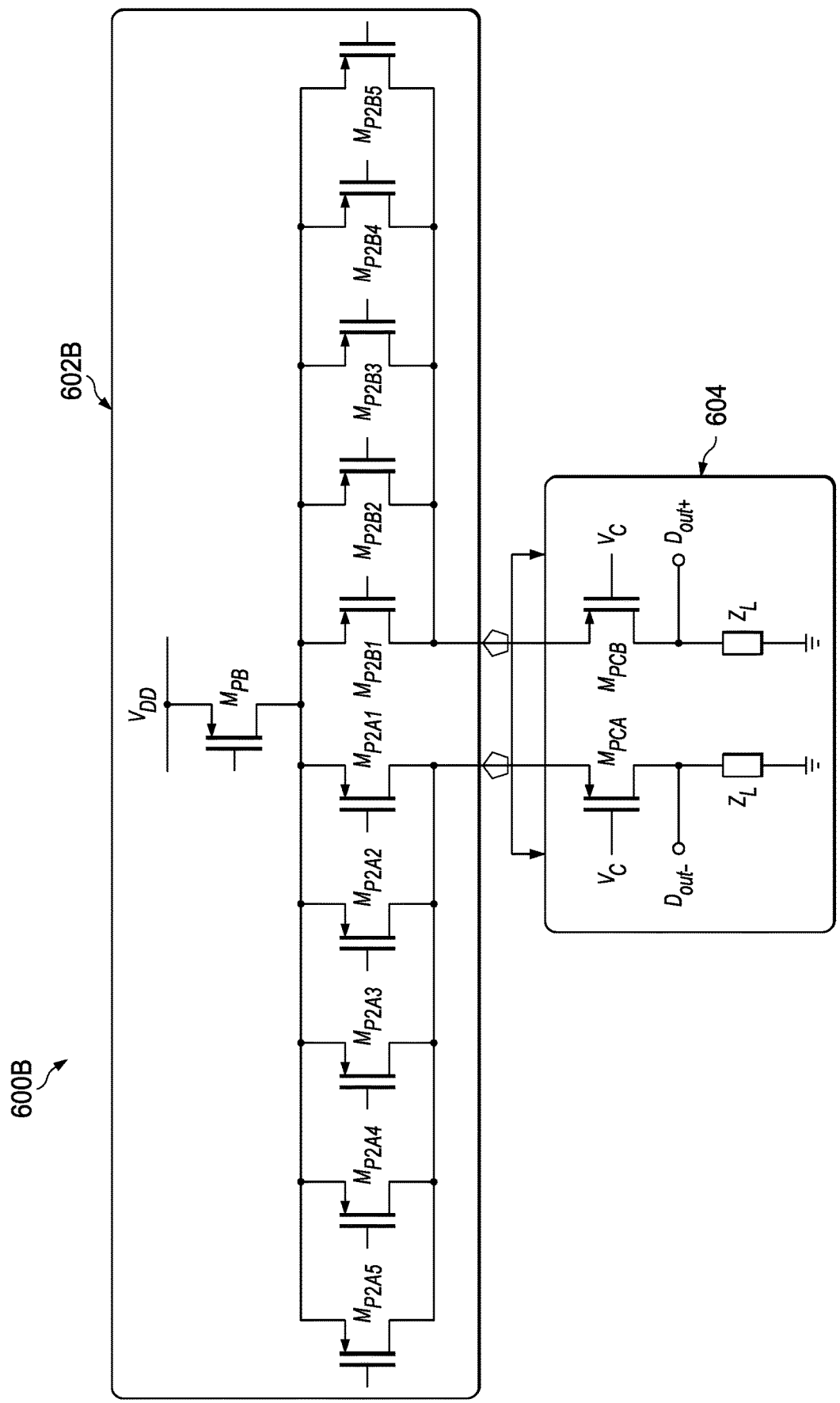
FIG. 6B depicts an example demodulator that can be utilized in the disclosed signal chains according to an embodiment of the disclosure.

Attenuation in the interfaces between analog filters 212, 214 and respective demodulators 216 can also be incorporated into the respective demodulator 216, rather than taking the different levels of attenuation at the OTA. In one embodiment shown in FIG. 6A, resistors $R_5$ in the second stage of OTA 400 are not utilized for signal scaling prior to the demodulator and resistors R7 are incorporated into first stage 602A of demodulator 600A, between the drain of transistor $M_{PB}$ and the source of each of transistors $M_{P2A}$, $M_{P2B}$. Resistors R7 in each demodulator 600A can be individualized to the specific demodulator. The use of either of resistors R5 and R7 rely on adjusting the voltage at demodulators 600, 600A. Another approach is to modify the current provided. In an embodiment shown in FIG. 6B, input stage 602B of demodulator 600B is modified. Transistor $M_{P2A}$ is split into five smaller transistors $M_{P2A1}$-$M_{P2A5}$, with the five smaller transistors being coupled in parallel. Similarly, transistor $M_{P2B}$ is split into five smaller transistors $M_{P2B1}$-$M_{P2B5}$, with the five smaller transistors being coupled in parallel. In each of demodulators 600B, the number of gates of $M_{P2A1}$-$M_{P2A5}$ and $M_{P2B1}$-$M_{P2B5}$ that are turned on determines the current provided to second stage 604. In a third embodiment, which is not specifically shown, rather than splitting transistors $M_{P2A}$, $M_{P2B}$ into smaller transistors, transistors $M_{PCA}$, $M_{PCB}$ in second stage 604 are split in the same manner as shown in FIG. 6B. Again, the number of gates of these split transistors that are turned on determines the current through second stage 604.

Figure 7A:
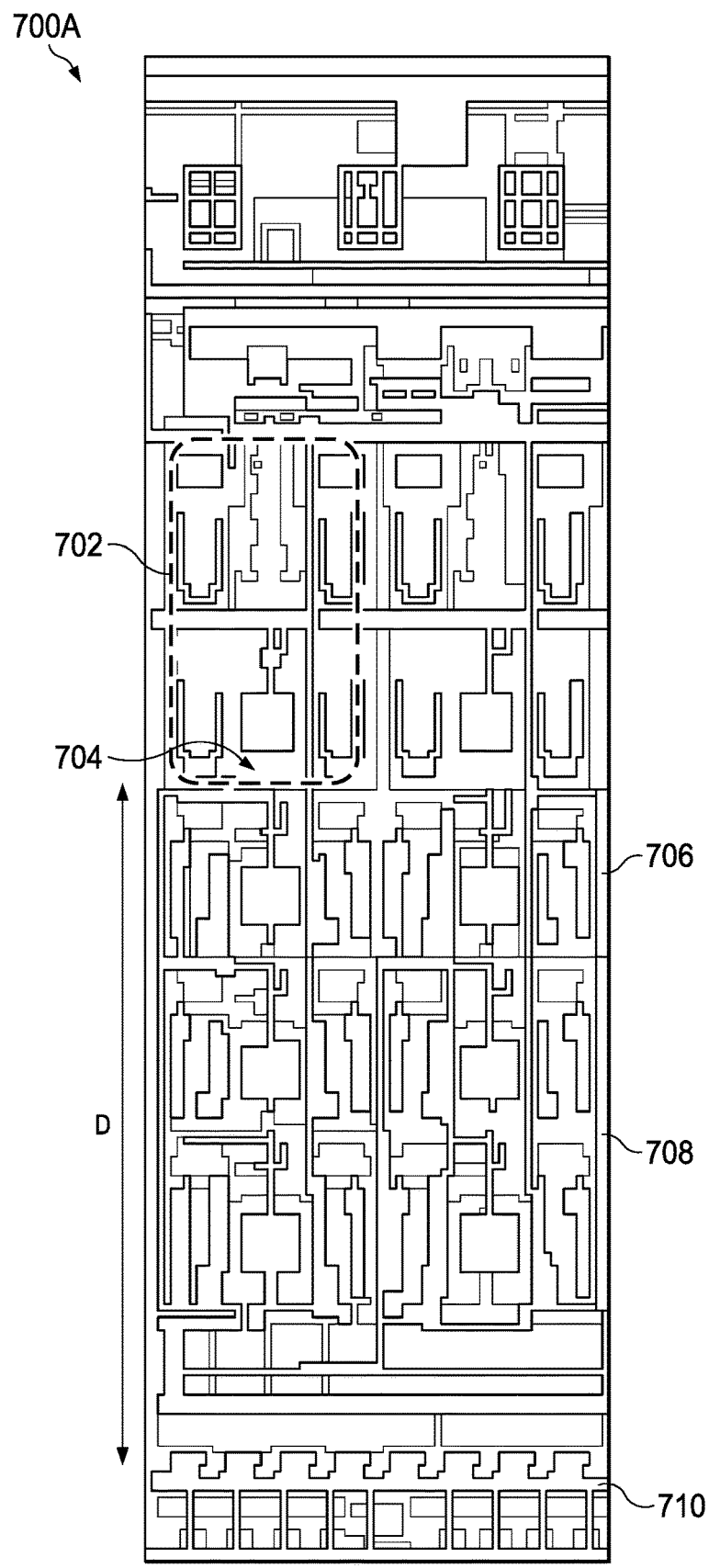
FIG. 7A depicts the physical placement of elements including a shield that separates an analog domain and a digital domain on an example semiconductor chip according to an embodiment of the disclosure.

Additionally, the sensitive analog signal used by the demodulators can be influenced by digital noise generated by blocks within the demodulators. FIG. 7A depicts the placement in silicon of elements of the disclosed circuit that include the demodulator. Filter 702 lies in the upper half of circuit section 700A, with attenuator/demodulator input stage 704 lying just below filter 702. A sensitive analog signal 706 of the demodulator has high impedance and is responsible for converting the input voltage from $D_{IN-}$, $D_{IN-}$ to current. Analog signal 706 extends next to the OTA differential outputs 710. The analog signal that interfaces to digital logic is routed using a shield 708 that is placed over a low impedance cascode node.

The demodulator converts the input analog signal $D_{IN+}$, $D_{IN-}$ to a series of digital pulses in output signal $D_{OUT+}$, $D_{OUT-}$. The differential input of the demodulator at $D_{IN+}$, $D_{IN-}$ is high impedance; however, the input impedance into the source terminals of $M_{PCA}$ and $M_{PCB}$ is low, and assumes a value of $2/G_m$, differentially. Typically for transistors biased in the subthreshold regime, transconductance $G_m = I/V_t$, and for a current of 10 nA, this value indicates resistance of 26 mV/10 nA=2.6 Mohms single ended, or 2×2.6=5.2 Mohms. Compared to the filter interfacing impedances of about 20 Mohms differential, the present embodiment provides a 4× improvement in bandwidth with the capacitance obtained due to the routing through shield 708.

Shield 708 separates digital noise generating blocks from the sensitive analog signal without impacting the bandwidth of operation. The bandwidth is associated with the RC time constant: for a given capacitance C, a lower resistance would lead the 3 dB cut-off frequency to be higher, since the 3 dB cut-off frequency is equal to $1/(2\pi RC)$. The filter stages, e.g., filters 212, 214, are alternated with respect to their differential phase to create a distributed twisted pair for the signal lines all throughout the signal chain. This alternation is shown in FIG. 3, where the outputs of each filter stage 302, 304 exchange their positions prior to being provided to the following filter stage. The alternation leads to superior cross-talk immunity and helps provide isolation and signal integrity.

Figure 7B:
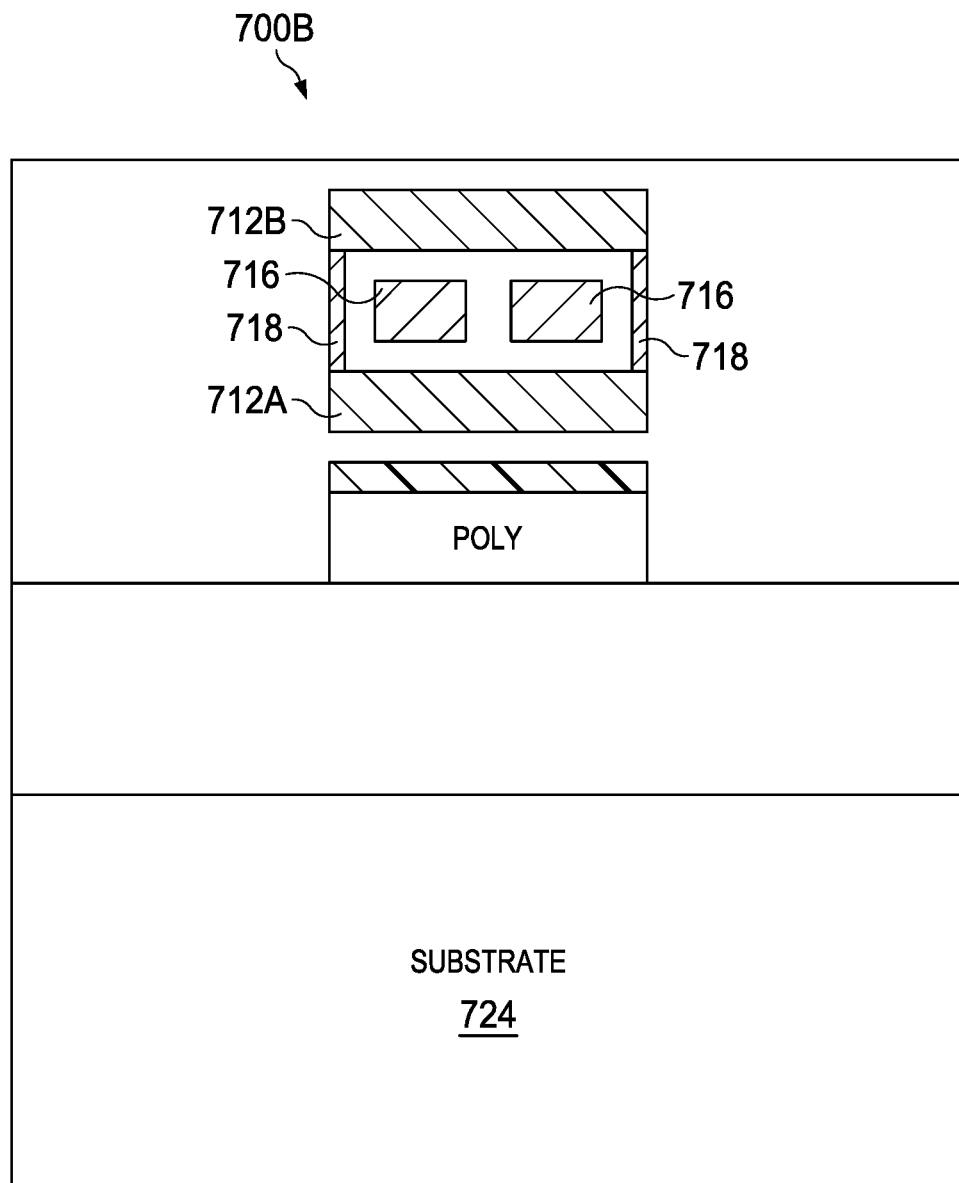
FIG. 7B depicts an example shield for sensitive signals according to the prior art.
Figure 7C:
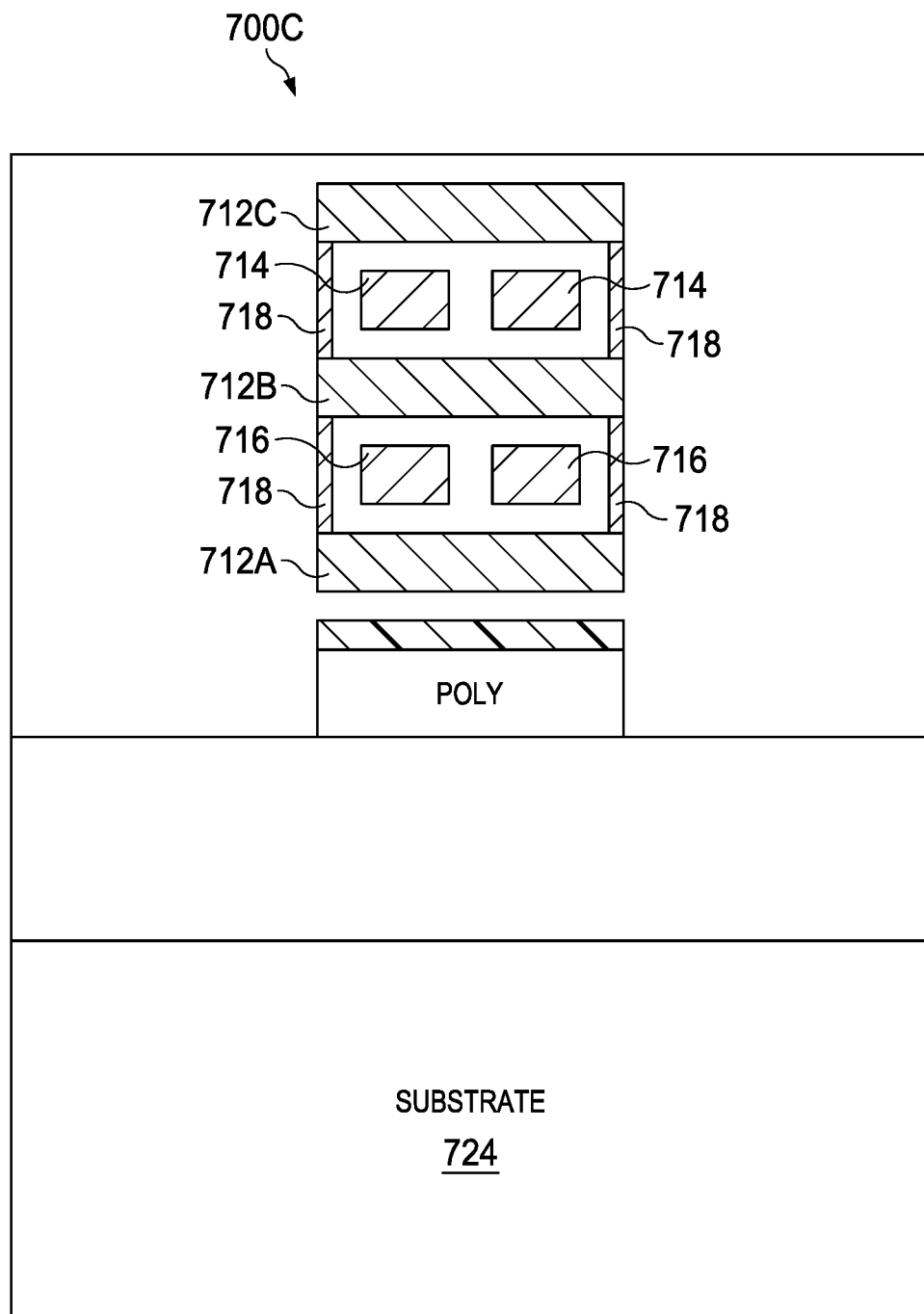
FIGS. 7C and 7D depict example shields for sensitive signals according to embodiments of the disclosure.
Figure 7D:
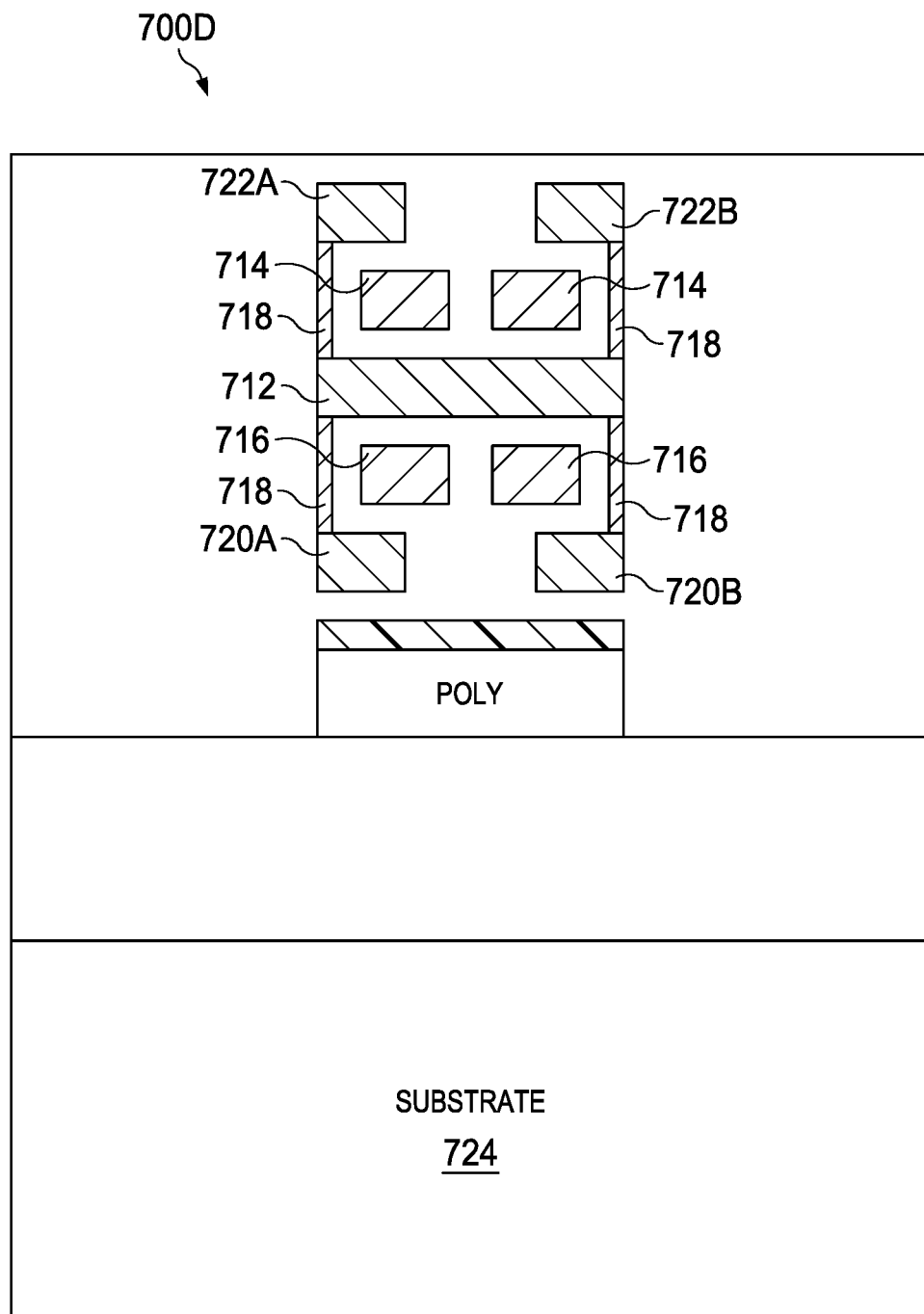

Isolation of the sensitive analog signal 706 from the large switching digital signal is of great importance for low power systems such as the present circuit. Traditional shielding schemes provide a complete enclosure of the sensitive signals, an example of which is shown in FIG. 7B. Shield 700B carries differential signal pair 716, which is formed in metal layer 2, enclosed by grounded shield elements 712A (metal layer 1), 712B (metal layer 3), and via mesh 718. In FIG. 7C, shield 700C discloses a modification to the shield 700B, the modification allowing two different systems of differential lines 714, 716 to share the same lateral area, leading to area compaction with one signal line on top of another. Shield 700C adds differential pair 714, additional via mesh 718 and grounded shield elements 712C (metal layer 5) to the previously existing structure. Both shield 700B and shield 700C allow the best isolation from the neighboring signal and noise sources, but these structures also lead to a large parasitic capacitance that impacts the low power design adversely. FIG. 7D depicts an alternate shield structure 700D, which along with a twisted pair style layout, allows the signal lines to have nearly equal amounts of capacitance on both lines while making the capacitance lower. Basically, the top layer 722 and bottom layer 720 of the shield 700D are opened up. In other words, bottom layer 720 and top layer 722 do not form a solid barrier between the two via mesh portions 718; instead, a first section 720A is coupled to a first via mesh 718 and a second section 720B is coupled to a second via mesh 718, with a dielectric material lying between sections 720A and 720B. Similar couplings are formed between upper layer 722A and 722B. Shield structure 700C can also be "lifted up" by one metal layer by routing the two upper signal lines in metal layer 5 instead of metal layer 4 and shifting lower levels correspondingly upward. This increases the distance of the signal lines 714, 716 from the substrate 724, leading to further isolation of substrate noise and parasitic capacitance of the signal lines to ground.

Figure 8:
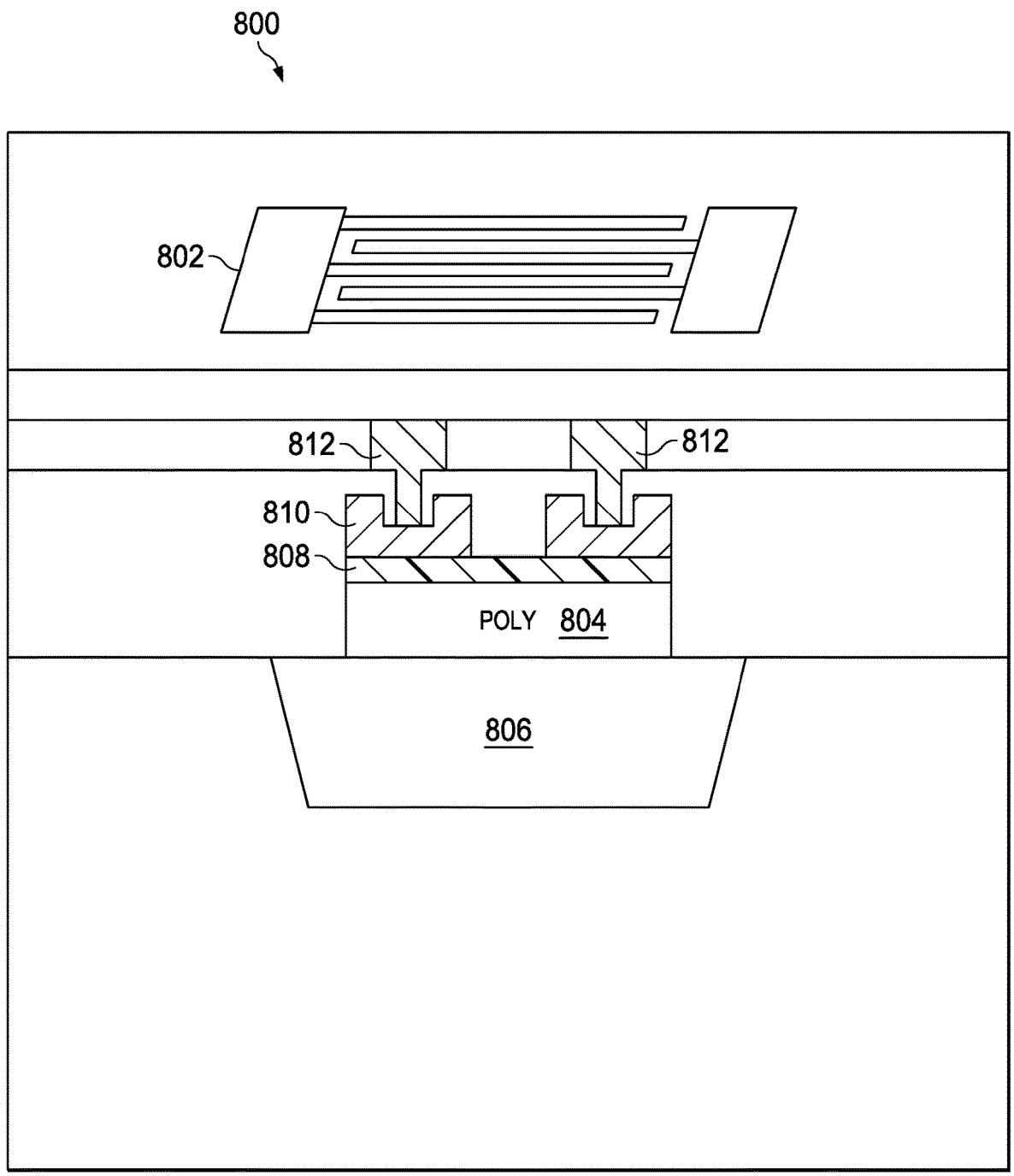
FIG. 8 depicts an example physical placement of capacitors over resistors to decrease required area in a wake-up receiver built on an example semiconductor chip according to an embodiment of the disclosure.

In addition to optimizing performance of the receiver, savings in lateral area on the chip can be achieved by co-locating passive components, i.e., the resistors and capacitors. In order to perform this co-location in the analog filters, the resistances and capacitances are carefully chosen so that the capacitors can be placed on top of the resistors or else the resistors can be placed on top of the capacitors. FIG. 8 discloses an example cross-section 800 of capacitors 802 on top of polysilicon block resistors 804. The capacitors 802 in this embodiment are comb capacitors formed using the metallization layers. Although only one metallization layer is shown in this embodiment, capacitors 802 can be formed in multiple metallization layers, e.g., metal layers 1-5. Capacitors 802 are placed above polysilicon resistors 804, although capacitors 802 may also be placed above diffusion resistors (not specifically shown) that are formed in a well structure. Another arrangement could include placing polysilicon resistors on top of diffusion resistors and metal capacitors placed above the polysilicon resistors. Polysilicon resistors 804 are placed on top of isolation region 806, which can be trench isolation, a field oxide layer or other type of isolation region. Polysilicon resistor 804 may be capped with a layer of silicon nitride 808, with silicide contact regions 810 formed at each end of resistor 804 and metallization layers 812 contacting the silicide contact regions 810.

Figure 9:
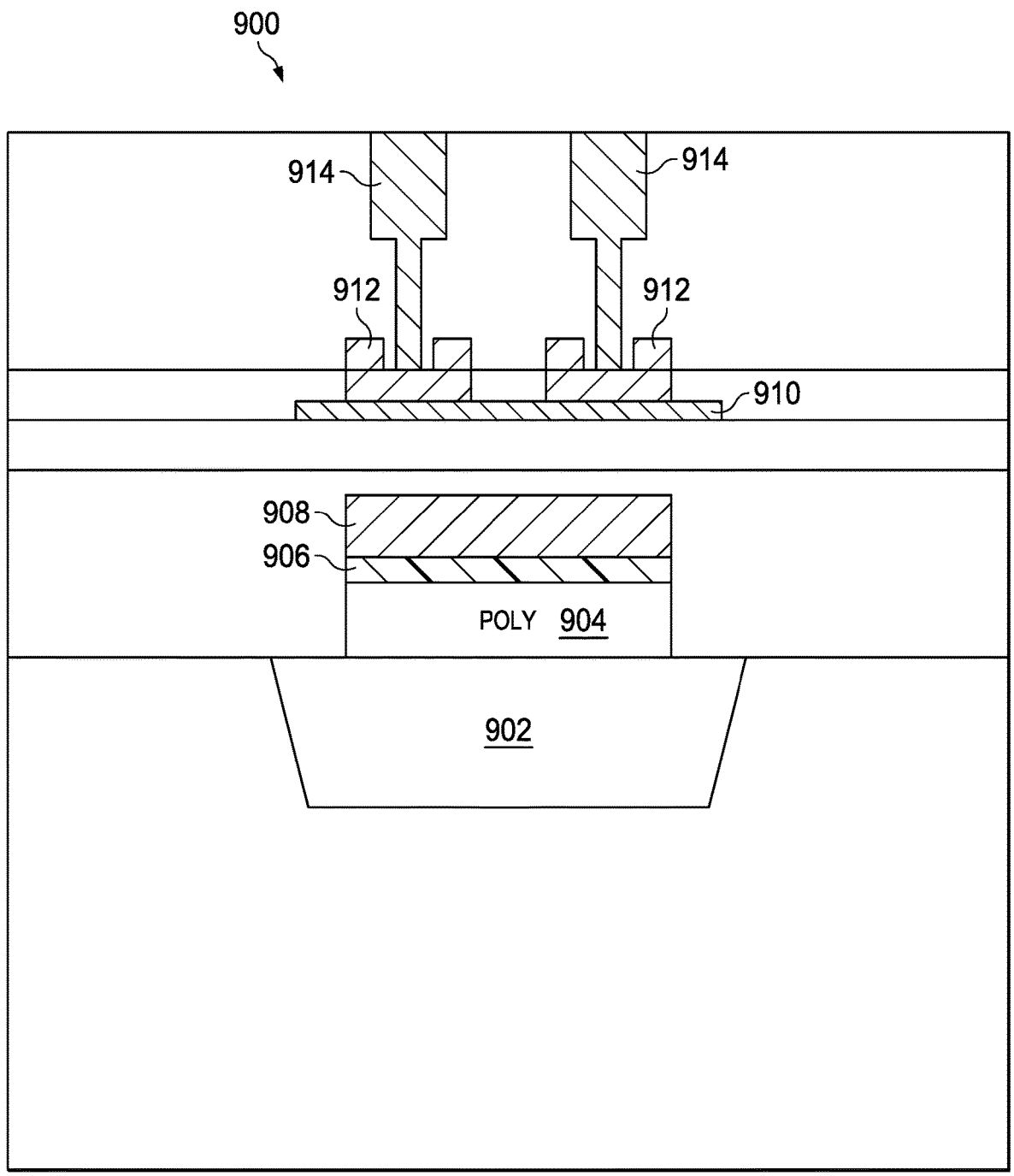
FIG. 9 depicts an example physical placement of resistors over capacitors to decrease required area in a wake-up receiver built on an example semiconductor chip according to an embodiment of the disclosure.

FIG. 9 depicts an example cross-section 900 of resistors placed over capacitors. In this embodiment, isolation region 902 is formed of a dielectric material such as silicon oxide and may be a trench isolation structure, field oxide or other dielectric isolation structure. A layer of doped polysilicon forms bottom plate 904, while dielectric 906 may be silicon dioxide or other suitable dielectric material. The top layer 908 of the capacitor may be tantalum nitride, titanium-tungsten alloy or other suitable metal layer. A precise resistor 910 is placed above the capacitors and may be formed of silicon chromium (SiCr) alloy, nickel chromium (NiCr) alloy, tantalum nitride, titanium nitride, tungsten, or any other suitable resistor material. Contacts 912 at either end of resistor 910 may be formed of titanium nitride, titanium tungsten, or any other suitable conductive material, with metallization layers 914 making contact with contacts 912. Hence, in addition to maximizing dynamic range per milliwatts, the proposed solution maximizes impedance density, so that both low power and low area are simultaneously achieved.

A number of innovative ideas have been presented in the disclosed low power, low area, wake-up receiver. Multiple signal chains are always ON to detect a wake-up signal and offer both low power and low area solutions. A combination of a high sensitivity path and a low sensitivity path covers a large dynamic range without the use of automatic gain control. The low sensitivity path can use resistive degeneration to reduce antenna loading and the high sensitivity path can use an LNA and large biasing resistors to reduce antenna loading. The filters are modular, of low quality factor, and are either real bandpass or real low-pass. At least one filter in each path provides DC blocking through the use of input capacitance that is part of the structure of the filter. The first filter may set the output and input common modes at half the supply rail and there is no DC current flow in feedback resistors. Multiple transistors operate in the subthreshold region, which provides easy calibration technique. In the subthreshold region, transconductance is proportional to the biasing current and measuring quiescent current with high accuracy is sufficient to achieve constant transconductance. All stages may offer positive real part of input and output impedances.

Coupling between elements of the signal chain is direct, including the filter to demodulator coupling. Attenuation using tapping of the resistive load in the output stage of the OTA allows multiple demodulators to be coupled to a single filter stage and saves area. An input stage of the demodulator is placed close to the filters, while the output is close to the digital logic, the long routing of the low impedance node is provided through a shield, which is opened up from previous shields to reduce parasitic capacitance. Further space savings can be accomplished by providing capacitors and resistors in the same area; capacitors can be placed over resistors or resistors can be placed over capacitors in multiple different embodiments.

The OTAs used in the filters may realize a dominant pole at the at the output of the filter network and the non-dominant pole can be pushed out. Resistors and capacitors may provide a zero that can be placed on the non-dominant pole to achieve the maximum bandwidth for a given current consumption; while the same resistors and capacitors can also provide compensation for the common mode circuit, thereby reducing area. Common mode feedback may applied in the last stage to reduce the number of poles and zeros in the system.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A keyless entry device comprising a receiver, the receiver comprising:
   an antenna configured to receive a signal;
   a signal chain coupled to the antenna, the signal chain comprising:
      a first path comprising a first mixer coupled to the antenna, the first mixer comprising a first plurality of complementary transistor pairs coupled in parallel between a first voltage and a second voltage; and
      a second path coupled in parallel with the first path, the second path comprising a second mixer coupled to the antenna, the second mixer comprising a second plurality of complementary transistor pairs coupled in parallel between the first voltage and the second voltage; and
   a switch coupled to the first path and the second path, wherein the switch is configured to select one of the first path or the second path in response to the signal.

2. The keyless entry device of claim 1, wherein the first mixer uses a common mode that is mid-way between the first voltage and the second voltage.

3. The keyless entry device of claim 1, wherein the first path further comprises an analog filter coupled to the first mixer.

4. The keyless entry device of claim 3, wherein the analog filter comprises an operational transconductance amplifier (OTA).

5. The keyless entry device of claim 4, wherein an input common mode of the analog filter and an output common mode of the analog filter are held at half a difference between the first voltage and the second voltage.

6. The keyless entry device of claim 5, wherein an output stage of the OTA comprises compensation elements that compensate for the output common mode and a differential mode.

7. The keyless entry device of claim 6, wherein the output stage of the OTA comprises a common mode feedback amplifier.

8. The keyless entry device of claim 3, wherein the first path further comprising a demodulator directly coupled to the analog filter, the demodulator having an input transistor.

9. A signal chain, comprising:
   a first path comprising:
      a first mixer configured to be coupled to an antenna; and
      a first analog filter coupled to the first mixer, wherein the first analog filter includes a first operational transconductance amplifier and a second operational transconductance amplifier, the first operational transconductance amplifier configured to consume more current than the second operational transconductance amplifier; and
      a second analog filter coupled in series with the first analog filter, the second analog filter comprising a first input capacitor and a second input capacitor, the first input capacitor and the second input capacitor configured to block a first DC offset associated with the first analog filter; and
   a second path coupled in parallel with the first path, the second path comprising:
      a second mixer configured to be coupled to the antenna;
      a third analog filter coupled to the second mixer, wherein the third analog filter includes a third operational transconductance amplifier and a fourth operational transconductance amplifier, the third operational transconductance amplifier configured to consume more current than the fourth operational transconductance amplifier;
      a fourth analog filter coupled in series with the third analog filter, the fourth analog filter comprising a third input capacitor and a fourth input capacitor, the third input capacitor and the fourth input capacitor configured to block a second DC offset associated with the third analog filter; and
   a first amplifier coupled between the antenna and the second mixer.

10. The signal chain of claim 9, wherein the first mixer comprises a plurality of complementary transistor pairs coupled in parallel between a first voltage and a second voltage.

11. The signal chain of claim 10, wherein the first mixer uses a common mode that is mid-way between the first voltage and the second voltage.

12. The signal chain of claim 10, wherein an input common mode of the first analog filter and an output common mode of the first analog filter are held at half a difference between the first voltage and the second voltage.

13. The signal chain of claim 12, wherein an output stage of the first operational transconductance amplifier comprises compensation elements that compensate for the output common mode and a differential mode.

14. The signal chain of claim 13, wherein the output stage of the first operational transconductance amplifier comprises a common mode feedback amplifier.

15. The signal chain of claim 9, the first path further comprising a demodulator directly coupled to the first analog filter, the demodulator having an input transistor.

16. The signal chain of claim 9, wherein the first path does not include a second amplifier coupled between the antenna and the first mixer.

17. A signal chain, comprising:
a mixer;
a first analog filter coupled to the mixer;
a second analog filter coupled in parallel to the mixer;
a first demodulator coupled to the first analog filter, wherein the first demodulator comprises a shield configured to separate digital noise from an analog domain of the first demodulator; and
a second demodulator coupled to the second analog filter.

18. The signal chain of claim 17, wherein the first demodulator comprises an input transistor.

19. The signal chain of claim 18, wherein the first demodulator further comprises a resistor coupled to the input transistor.

* * * * *